US011469583B2

(12) United States Patent
McCoy

(10) Patent No.: US 11,469,583 B2
(45) Date of Patent: Oct. 11, 2022

(54) BORE SPACERS FOR UNDERGROUND INSTALLATIONS

(71) Applicant: Underground Devices, Inc., Northbrook, IL (US)

(72) Inventor: Donald P. McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 0 days.

(21) Appl. No.: 17/581,869

(22) Filed: Jan. 22, 2022

(65) Prior Publication Data

US 2022/0263307 A1  Aug. 18, 2022

Related U.S. Application Data

(60) Provisional application No. 63/149,717, filed on Feb. 16, 2021.

(51) Int. Cl.
*H02G 9/06* (2006.01)
*H02G 1/08* (2006.01)

(52) U.S. Cl.
CPC ............... *H02G 9/06* (2013.01); *H02G 1/08* (2013.01)

(58) Field of Classification Search
CPC ..... F16L 2101/50; H02G 1/081; H02G 1/088; H02G 11/006; H02G 9/00; H02G 9/02; H02G 9/06
See application file for complete search history.

(56) References Cited

U.S. PATENT DOCUMENTS

| | | |
|---|---|---|
| 1,805,990 A | 5/1931 | Makowski |
| 1,821,234 A | 9/1931 | Parker |
| 2,462,399 A | 2/1949 | Hinchman |
| D165,901 S | 2/1952 | Bloom et al. |
| 2,686,643 A | 8/1954 | Bloom et al. |
| 2,849,027 A | 8/1956 | Tetyak |
| 2,932,687 A | 4/1960 | Cook |
| 2,937,833 A | 5/1960 | Sachs |
| 3,464,661 A | 9/1969 | Alesi, Jr. |
| 3,523,667 A | 8/1970 | Guerrero |
| 3,531,071 A | 9/1970 | Kubli |

(Continued)

OTHER PUBLICATIONS

Carlon snap-n-stac combo spacers, 2007, 6 pages.

*Primary Examiner* — Tyrone V Hall, Jr.
(74) *Attorney, Agent, or Firm* — David W. Okey LLC

(57) ABSTRACT

Apparatuses and methods are disclosed for assembling ducts or conduits with multi-part spacers for underground installation. Sequential loading of conduits to multi-part spacers, as opposed to older methods of end loading, allows construction workers to easily assemble conduits to a plurality of multi-part duct spacers above-ground. The multi-part loading technique allows sequential loading of conduits into portions of spacers, the spacers having bores to accommodate the conduits. The parts or components of the multi-part spacers may themselves cooperate to mount conduits into a conduit bank or bundle. Thus, conduits are assembled or mounted to a first portion of the spacer, followed by mounting a second portion of the spacer and then additional conduits, which may be mounted to either or both of the first and second portions. Once assembled, the banks or bundles may then be secured with banding and wheeled into a protective casing.

30 Claims, 17 Drawing Sheets

(56) References Cited

U.S. PATENT DOCUMENTS

| | | | |
|---|---|---|---|
| 3,643,005 A | 2/1972 | Mathews | |
| 3,765,629 A | 10/1973 | Voelker et al. | |
| 3,783,907 A | 1/1974 | Skinner | |
| 3,856,246 A | 12/1974 | Sinko | |
| 3,964,707 A | 6/1976 | Lewis | |
| 4,093,076 A | 6/1978 | Newton | |
| 4,099,626 A | 7/1978 | Magnussen, Jr. | |
| 4,114,241 A | 9/1978 | Bisping | |
| 4,183,484 A | 1/1980 | Mathews | |
| 4,244,542 A | 1/1981 | Mathews | |
| 4,306,697 A | 12/1981 | Mathews | |
| D265,052 S | 6/1982 | Husted | |
| 4,601,447 A | 7/1986 | McFarland | |
| 4,618,114 A | 10/1986 | McFarland | |
| D296,074 S | 6/1988 | Seyfarth | |
| 5,104,072 A | 4/1992 | Kuo et al. | |
| 5,605,419 A | 2/1997 | Reinert, Sr. | |
| 5,827,441 A | 10/1998 | Solbjorg | |
| 6,053,456 A | 4/2000 | Dispenza | |
| 7,223,052 B1 | 5/2007 | Evans | |
| 7,806,629 B2 * | 10/2010 | McCoy | H02G 9/06 405/184 |
| 7,942,371 B1 | 5/2011 | McCoy | |
| 3,020,811 A1 | 9/2011 | Nelson | |
| 8,294,030 B2 | 10/2012 | Pollard, Jr. | |
| 8,342,474 B2 | 1/2013 | Gilbreath | |
| 8,783,631 B2 | 7/2014 | McCoy | |
| 8,876,068 B2 | 11/2014 | McCoy | |
| D722,045 S | 3/2015 | Mok et al. | |
| 8,985,529 B2 | 3/2015 | Masters et al. | |
| D771,478 S | 11/2016 | McCoy | |
| D772,044 S | 11/2016 | McCoy | |
| D772,046 S | 11/2016 | McCoy | |
| D772,047 S | 11/2016 | McCoy | |
| D772,049 S | 11/2016 | McCoy | |
| D772,050 S | 11/2016 | McCoy | |
| D794,433 S | 8/2017 | McCoy | |
| D794,434 S | 8/2017 | McCoy | |
| D795,046 S | 8/2017 | McCoy | |
| D795,047 S | 8/2017 | McCoy | |
| D795,048 S | 8/2017 | McCoy | |

\* cited by examiner

FIG. 8     80

- Assemble bore spacer duct bundle; place lower duct into fixture with lower bore spacer; FIG. 6A — 81
- Place first lower set of intermediate ducts on top of lower bore spacer; FIG. 6B — 82
- Place second upper set of intermediate ducts on top of first lower set of intermediate ducts; FIG. 6C — 83
- Place upper bore spacer onto second upper set of intermediate ducts; FIG. 6D — 84
- Place top duct onto upper bore saddle; FIG. 6D — 85
- Band both sides of the entire duct bundle; FIG. 6E — 86
- Run bore spacer duct bundle into casing; FIG. 6F — 87

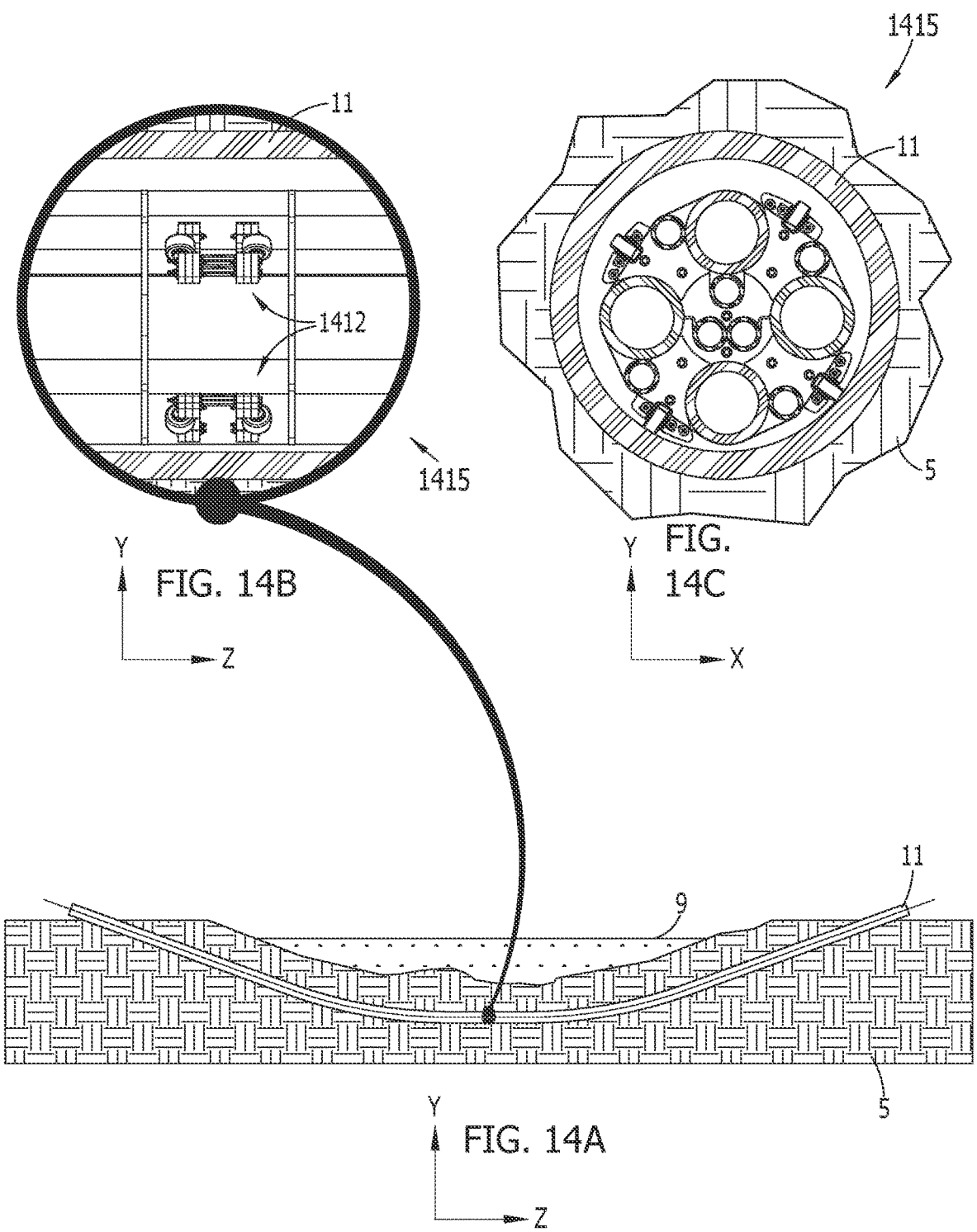

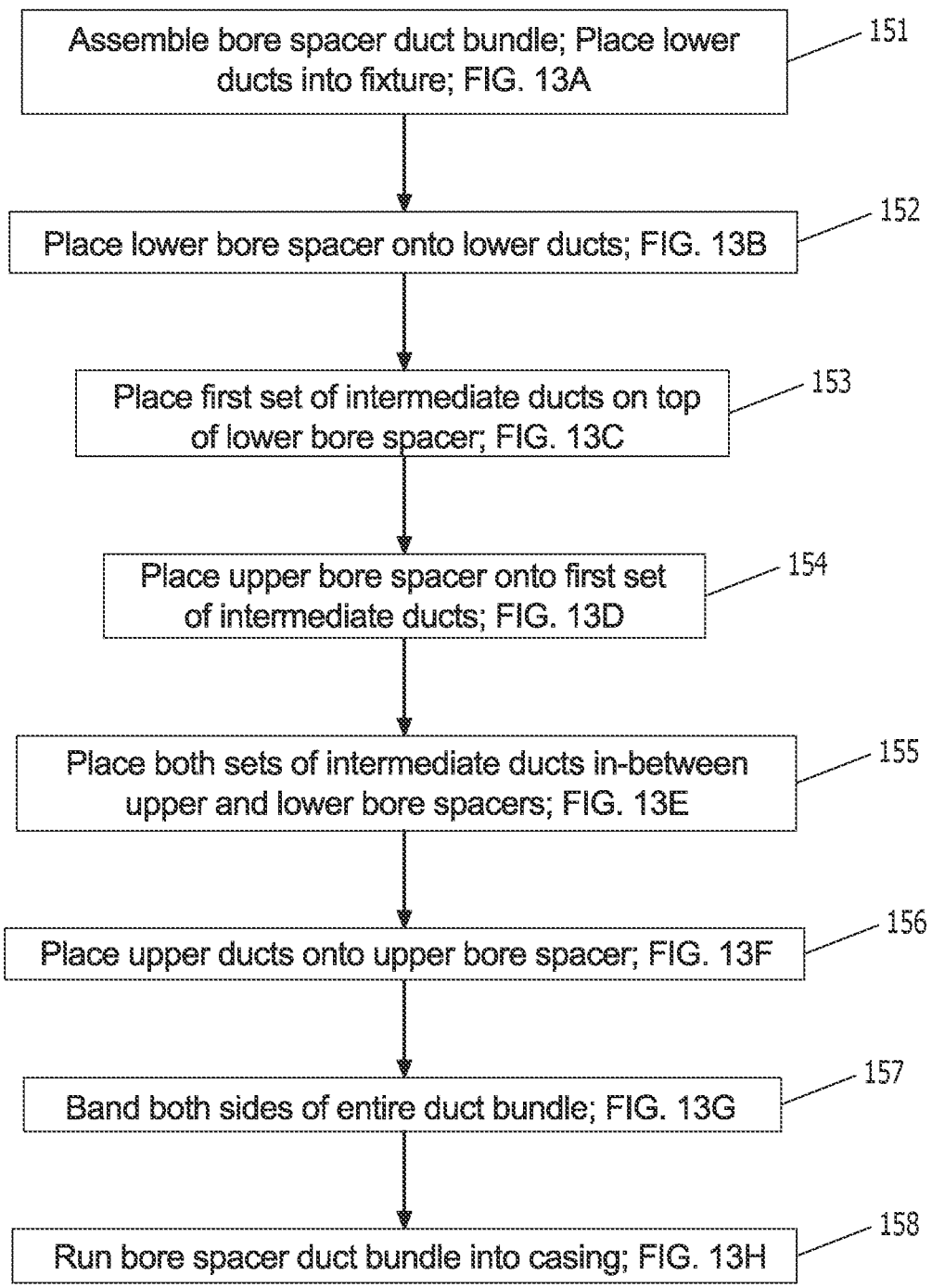

BORE SPACERS FOR UNDERGROUND INSTALLATIONS

CLAIM TO PRIORITY

The present application claims the benefit of U.S. Provisional Appl. 63/149,717, filed Feb. 16, 2021, which is hereby incorporated by disclosure.

BACKGROUND

Cables for electric power and for communication lines are run underground in order to protect them from above-ground elements and from the interference and damage they would suffer when installed above the ground or on poles or structures. The underground environment may be less hostile in some ways, but the history of underground cables suggests that the underground environment is not to be considered benign.

This patent concerns spacers used for the installation and spacing of communications and power cables under the ground and above ground. Cables for electric power and communication lines are run underground in order to protect them from above-ground elements and from the interference and damage they would suffer when installed above the ground or on poles or structures.

Power and communication distribution cables are typically routed aboveground. They are routed underground when for various reasons, aboveground routes are not permitted or are not possible. Most underground power and communication cables for private homes are dug directly. Power and communications cables for mission-critical installations receive more circumspect treatment. These installations include hospitals, airports, military bases, and major electric transmission lines. For most of these installations, an open cut trench is dug, conduit is placed in the lower portion of the trench in an organized and controlled separation bank, and the conduit is then encased in concrete forming what is commonly known as a concrete encased duct bank. The conduit is most often a round pipe made from plastic but on occasion may be of other shapes and material. Typically, the top of the duct bank is two feet or more below grade. The area between the top of the duct bank and grade is backfilled with sand, gravel, soil, or other appropriate fill. Power or communication cables or both are then pulled into the conduits.

In some instances, however, it is not possible to route an open-cut trench directly to the desired location without disruption. It may therefore be necessary to cross under a highway, a railroad, a waterway, or other obstruction. For these installations, a tunnel must be dug underneath, typically by digging a straight bore or by using directional drilling. A straight bore is typically used for relatively straight installations of less than 500 feet (150 m). After the bore is dug, a casing, typically made of steel, is pulled through the bore and conduit with spacers is pulled into the casing. Directional drilling is typically used for longer bores. In these installations, steel or other casing is most often used, but some installations are casing-less. The directionally drilled casing-less installation method is typically selected when the extra protection offered by a casing and grout is not deemed necessary and economy of the installation is of prime importance.

Underground conduits typically are placed in casings made of steel, high-density polyethylene (HDPE), concrete, fiberglass-reinforced thermoset polymers, such as reinforced thermosetting resin conduit (RTRC), or centrifugally-cast fiberglass reinforced polymers, e.g., Hobas pipe. Other casing materials may also be used. Casing lengths may range from 10 feet to 3,000 feet (3 to 920 m) or longer, with diameter from 4 inches to 60 inches (10 to 150 cm), or larger. The conduits themselves are typically made from high density polyethylene (HDPE), rigid polyvinyl chloride (PVC), fiberglass reinforced epoxy. Other conduit materials may be used. Conduit-in-casing installations are used to route communications and power cables under highways, streams and rivers, railroad track, and other obstructions that, for one reason or another, may not be disturbed. Underground power and communications cables are typically placed in directionally-drilled tunnels or straight-bored tunnels.

Directionally drilled holes normally used for conduit-in-casing installations or casing-less installations refer to a tunnel that starts at grade or in a pit that is slightly below grade. The tunnel goes downward at approximately a 20° angle until it is low enough to go under the obstruction. The obstruction may be 100 feet (30 m) or more below grade. When the tunnel is low enough to go under the obstruction it turns gently and then follows a line parallel to grade. When the tunnel has cleared the obstruction, it sweeps upward at an angle, typically about 40°, and exits at grade. In order to prepare a directionally drilled hole, construction crews start first with a pilot hole. After the pilot hole is installed, reamers of successively larger size are pulled through the hole until the hole is approximately 50% larger than required for the duct bank or casing. As the reamers are pulled through, the hole is kept full of mud made with bentonite to keep the tunnel from caving in or filling with water. Bentonite is a natural clay found in the earth's strata. After the directionally bored hole is completed, the duct bank is pulled into place displacing part of the bentonite.

Straight bores may be prepared in many ways, but are most often accomplished as follows. A boring pit is dug on one side of the obstruction, and a receiving pit on the other side. A length of auger is placed inside steel casing having a similar length and slightly large outer diameter. The auger and casing are placed into the boring pit. Using a special purpose boring machine, which is usually track-mounted, the casing is hydraulically jacked in the direction of the receiving pit while rotating the auger to remove the earth from inside the casing. Successive lengths of casing are welded to each other and successive lengths of auger are attached to remove earth from the casing. When the casing and auger reach the receiving pit, the augers are removed.

Meanwhile, an assembly of the conduits is prepared, the assembly including the conduits and spacers to maintain separation of the conduit in the casing. The spacers are placed along every several feet of conduit length. The assembly of conduits and spacers is then pulled into the casing and grout is placed between the casing and the conduit, filling the space in between them. Grout is a fluid mixture of sand, cement and water. Special additives are sometimes used to make the grout very fluid, to enhance thermal conductivity, or to slow hydration or curing of the grout. After the grout has hydrated, power and communications cables are pulled through the conduits.

One technique used to fill the space is known as the sacrificial grout injection pipe technique. This technique requires multiple sacrificial grout injection pipes or hoses, normally made from 2 inch, 3 inch or 4 inch (about 5 cm, 8 cm or 10 cm) diameter HDPE or PVC, that are successively placed along the length of the duct bank. Grout is pumped into the end of each grout pipe in turn until the space in the casing is filled with grout over the full length of the casing.

When the space that is reached by one grout pipe is filled, the next pipe or hose is used until the entire space in the casing has been filled with grout.

A number of methods have been devised for organization and separation control of conduits for open cut trench concrete encased duct banks. Many of these methods are depicted in the following patents: U.S. Pat. Nos. 2,462,399; 2,686,643; 2,849,027; 2,937,833; 3,523,667; 3,643,005; 3,856,246; 3,964,707; 4,183,484; 4,244,542; 4,306,697; 4,601,447; 4,618,114; 5,104,072; 5,605,419; 6,076,863; and 6,375,017. These prior art spacers and concrete encased duct bank installation methods hold the conduits vertically and horizontally, but do not provide for longitudinal restraint, probably because these patents envision filling an open cut trench with concrete or grout from above, not from the side as would be the case in a closed casing or directionally-bored hole.

U.S. Pat. Nos. 5,137,306, 5,372,388, 6,076,863 and 6,711,328 depict conduits separated by spacers that are placed inside a casing. These patents related to very small conduits for fiber optic cables. Since fiber optic cables do not generate any heat, so no provision is made in these designs for placement of grout between the conduit outer diameter and the casing inner diameter. Finally, U.S. Pat. No. 7,806,629 discloses side-loading spacers which are also useful in guiding and holding conduits or ducts for underground installations. This patent is incorporated by reference into this document for all that it discloses.

What is needed is a better way of spacing and holding apart conduits for power and communications cables in underground or confined installations. The improved method should allow for controlled spacing and excellent heat conduction, while providing an efficient, economical, and easy way to install the conduits.

SUMMARY

One aspect of the disclosure is a spacer. The spacer includes a first spacer arm comprising a plurality of bores on a first side of the first spacer arm and at least one bore on a second side of the first spacer arm, the first spacer arm further comprising two transversely-mounted wheels on opposite ends of the first spacer arm, and also includes a second spacer arm comprising a plurality of bores on a first side of the second spacer arm and at least one bore on a second side of the second spacer arm, the second spacer arm further comprising two transversely-mounted wheels on opposite ends of the second spacer arm.

Another aspect of the disclosure is a spacer. The spacer includes a first spacer arm comprising a plurality of bores on a first side of the first spacer arm and at least one bore on a second side of the first spacer arm, the first spacer arm further comprising two transversely-mounted wheels on opposite ends of the first spacer arm; a second spacer arm comprising a plurality of bores on a first side of the second spacer arm and at least one bore on a second side of the second spacer arm; a third spacer arm comprising a plurality of bores on a first side of the third spacer arm and at least one bore on a second side of the third spacer arm, the second spacer arm further comprising two transversely-mounted wheels on opposite ends of the second spacer arm; and a fourth spacer arm comprising a plurality of bores on a first side of the fourth spacer arm and at least one bore on a second side of the fourth spacer arm. In this spacer, the first and the second spacer arms are assembled together with a plurality of fasteners to form a first half of the spacer and the third and the fourth spacer arms are assembled together with a plurality of spacer fasteners to form a second half of the spacer.

Another aspect of the disclosure is a spacer. The spacer includes a first spacer arm comprising a plurality of bores on a first side of the first spacer arm and at least one bore on a second side of the first spacer arm, a second spacer arm comprising a plurality of bores on a first side of the second spacer arm and at least one bore on a second side of the second spacer arm, and a third spacer arm comprising a plurality of bores on a first side of the third spacer arm and at least one bore on a second side of the third spacer arm, the third spacer arm further comprising two transversely-mounted wheels on opposite ends of the third spacer arm. The spacer also includes a fourth spacer arm comprising a plurality of bores on a first side of the fourth spacer arm and at least one bore on a second side of the fourth spacer arm, a fifth spacer arm comprising a plurality of bores on a first side of the fifth spacer arm and at least one bore on a second side of the fifth spacer arm, and a sixth spacer arm comprising a plurality of bores on a first side of the sixth spacer arm and at least one bore on a second side of the sixth spacer arm, the sixth spacer arm further comprising two transversely-mounted wheels on opposite ends of the sixth spacer arm. In this spacer, the first, second and third spacer arms are assembled together with a plurality of spacer fasteners to form a first half of the spacer and the fourth, fifth and sixth spacer arms are assembled together with a plurality of spacer fasteners to form a second half of the spacer.

Another aspect of the disclosure is a method of loading conduit into multi-part conduit spacers for placement into a casing, a tunnel or a longitudinal arcuate hole. The method includes steps of furnishing a plurality of multi-part conduit spacers, each multi-part conduit spacer comprising, a first spacer arm comprising a plurality of bores on a first side of the first spacer arm and at least one bore on a second side of the first spacer arm, the first spacer arm further comprising two transversely-mounted wheels on opposite ends of the first spacer arm, and a second spacer arm comprising a plurality of bores on a first side of the second spacer arm and at least one bore on a second side of the second spacer arm, the second spacer arm further comprising two transversely-mounted wheels on opposite ends of the second spacer arm. The method also includes steps of placing a first conduit into an assembly fixture, placing the first spacer arm atop the first conduit, assembling a first plurality of conduits atop the first spacer arm, assembling the second spacer arm to the first plurality of conduits, assembling a second conduit atop the second spacer arm, thus forming a bundle, and securing the bundle by banding an outside of the bundle.

There are many aspects for this disclosure, only a few of which are detailed herein.

BRIEF DESCRIPTION OF THE DRAWINGS

FIG. 8 depicts a flowchart for use with the spacers according to the present disclosure;

FIGS. 14A-14C depict views of a duct bank in buried casing, the ducts separated by spacers according to the present disclosure; and FIG. 15 depicts a flowchart for use with the spacers according to the present disclosure.

DETAILED DESCRIPTION

Figure 1A:
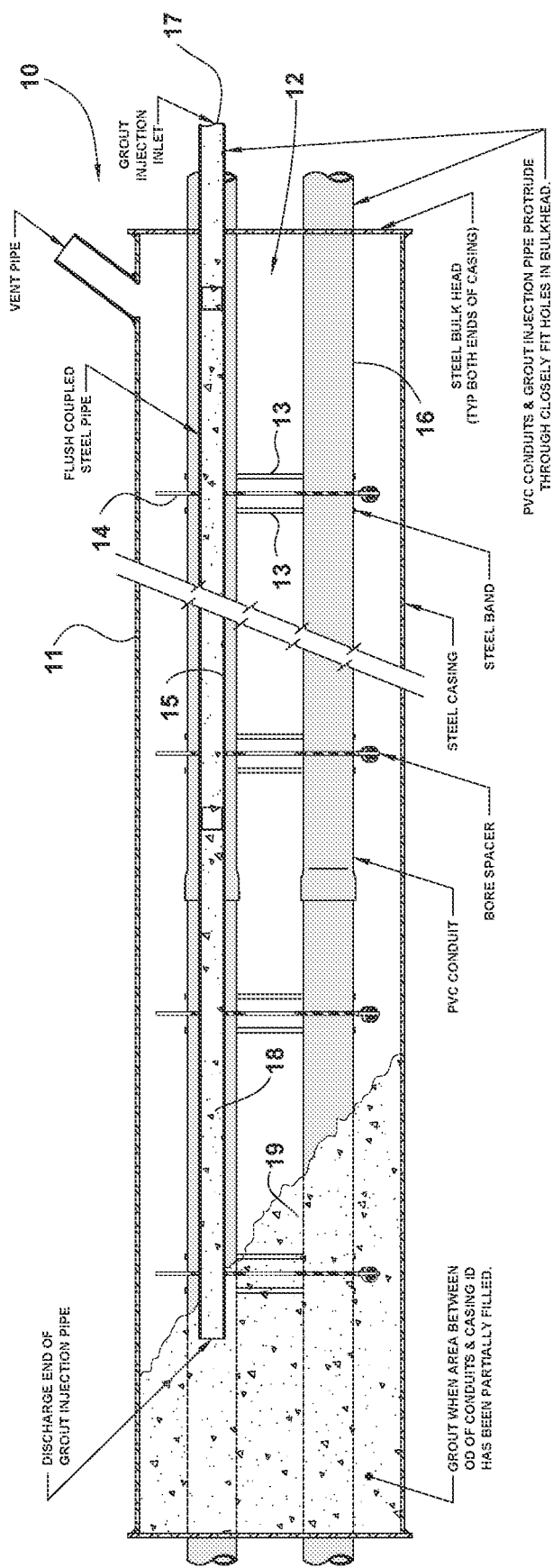
FIGS. 1A and 1B depict uses of underground conduits and spacers with injectable grout pipe techniques.

The preparation and execution of underground grouting installations for power and communications cables is not something for the faint of heart. As described above, thousands of pounds of cabling, conduit and wire bundles must be securely and safely installed. Installations sometimes range into the thousands of feet. Grout is blindly and horizontally injected at a high pressure into a casing, such as a casing made or steel or other material, through at least many hundreds of feet, and as noted, sometimes a thousand feet or more from each side. A typical installation, showing the single end extractable grout injection pipe method of injecting grout, is depicted in FIG. 1A. Underground conduit site 10 includes casing 11, typically between 12 and 48 inches (30 to 120 cm) in diameter, and now perhaps even up to 60 inches (150 cm) or more. A passage is dug into the ground and the casing is then placed into the ground. An assembly 12 of conduits 16 for several power or communications cables, or both, and a grout injection pipe, is then assembled to a plurality of spacers 14, such as single-wall bore spacers, of which the term single-wall is explained below. The spacers are used to ensure minimum distances between conduits for power cables to allow for heat dissipation and also to minimize EMI/RFI interferences. The spacers are also used to support the grout pipe.

The conduits are typically mounted to the spacers and then held in place by fasteners or banding 13 placed around the cables or the spacers, or both. Grout 18 is injected by grouting pumps through a grout injection inlet 17 and pumped through grout pipes 15. As noted, the grout may need to be pumped many hundreds of feet. The grout eventually reaches the area 19 downstream at the end of the grout pipe and fills the space in the casing 11 that is not otherwise occupied by conduits, or spacers.

Figure 1B:
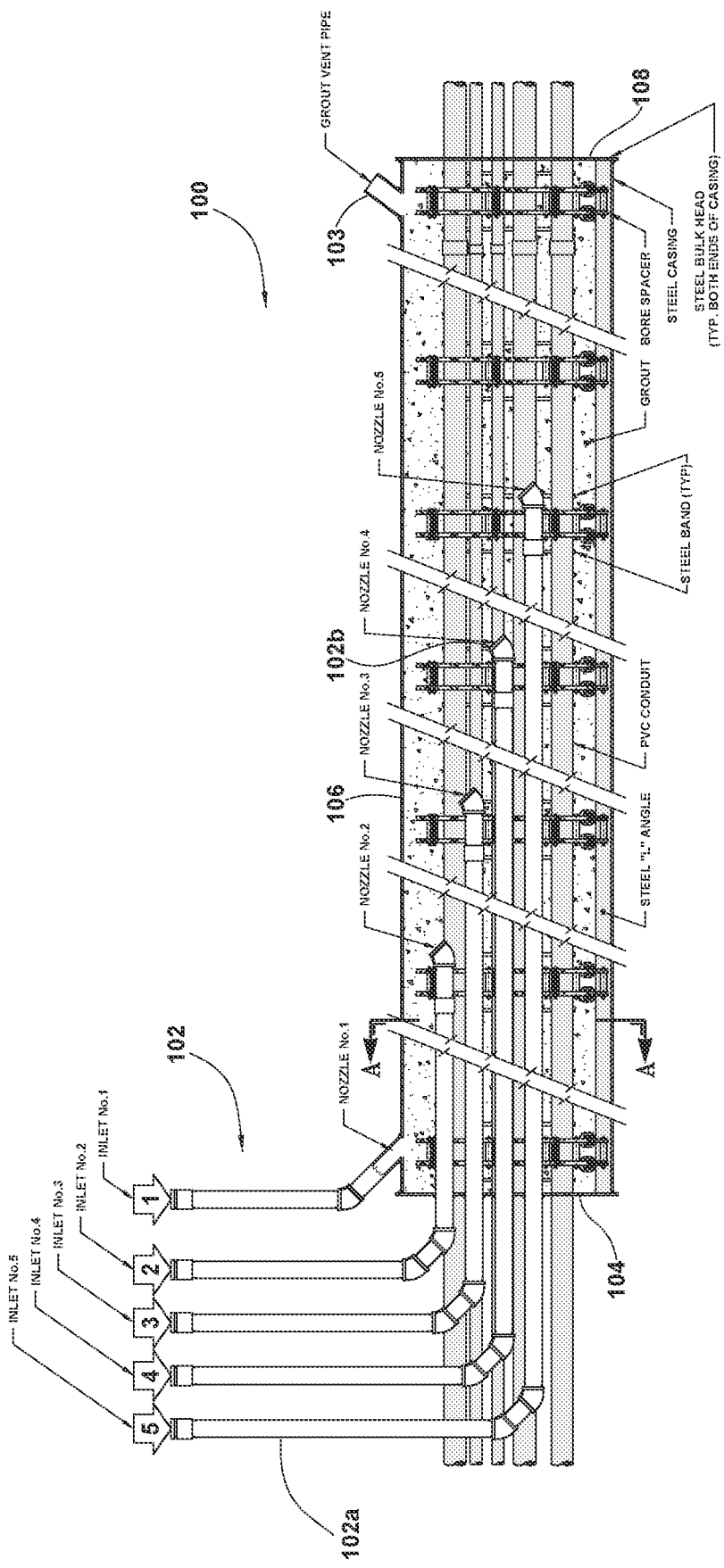

FIGS. 1A and 1B depict two distinct prior art methods for filling casings with grout, the single end extractable grout injection pipe technique, in FIG. 1A, and the single end sacrificial grout injection pipe method in FIG. 1B.

The single extractable grout injection pipe technique, depicted in FIG. 1B, is accomplished by installing an injection pipe from the boring end of the casing to a point just a few feet short of the receiving end of the casing. The injection pipe is installed in the casing along with the conduits and bore spacers. The extractable grout injection pipe is supported by, but is not attached to the bore spacers. With this technique, the outer diameter of the extractable injection pipe must be smooth over its full length to ensure that it will ride without hindrance through and/or over the bore spacers. The injection pipe may be flush-coupled steel, lengths of steel pipe that have been welded together or a single continuous length of heavy wall HDPE pipe. Heavy wall PVC Conduit is on occasion used but the belled ends that are used to connect the sections of PVC conduit together cause a hindrance in the extraction.

Both ends of the casing are closed off or bulk headed. The conduits extend through closely fitted holes in the bulkheads. The grout injection pipe fits through an oversize hole in bulkhead located on the boring end of the casing. From the boring end of the casing, grout is pumped into the grout injection pipe. As the area between the conduit outer diameters and casing inner diameter is filled, the grout the injection pipe is withdrawn. The discharge end of the grout injection pipe is kept embedded in the grout slurry at all times to avoid air pockets. The grout is pumped through the injection pipe under sufficient pressure to fill all open spaces but not high enough to cause the conduits to collapse or pull apart. After the grout has hydrated and hardened, power cables or communication cables are pulled into the conduits.

The other generally-used technique is the single end sacrificial grout injection method, depicted in FIG. 1B. This method 100 is used on relatively long bores where the grout has to be pumped a long distance. Pumping grout through the sacrificial grout injection pipes help ensure that there are no grout voids and allows more time to fill the casing with grout. The single end sacrificial grout injection pipe method is accomplished by installing a multiple number of grout injection pipes 102 of varying lengths from the boring end 104 of the casing 106 to the receiving end 108 of the casing. The first injection pipe 102a is installed at the boring end of the casing and goes directly into the casing. Additional injection pipes, each a shorter length than the last, are secured to the bore spacers along with the conduits and loaded into the casing. The injection pipes may be steel, heavy wall HDPE or heavy wall PVC and are normally 2 inches (5 cm) nominal to 4 inches (10 cm) nominal in diameter.

In this technique, both ends of the casing are bulk headed. The conduits and the grout injection pipes extend through closely fitted holes in the bulkheads. A vent 103 is placed at the top of the receiving end of the casing. Grout is pumped into the first injection pipe 102a until the far nozzle 102b of the second injection pipe has been covered with grout. After the nozzle of the second injection pipe has been covered, the inlet to the first injection pipe is closed and grout is pumped into second injection pipe until the third injection pipe nozzle has been covered with grout. This sequence is repeated until grout discharges from the vent 103 located at the receiving end of the casing. The grout injection pipes are left in the casing and the grout is left to hydrate.

Both techniques require that the grout injection is a continuous, non-stop process. The reason that this injection method is known as the "single end sacrificial grout injection pipe method" is that the grout is pumped into the casing from one end only and the grout injection pipes are sacrificed in the process of pumping the grout into the casing. After the grout has hydrated, hardened, power cables or communication cables are pulled into the conduits. There a number of variations to these two grout injection methods. Almost all of the variations have one thing in common; they require some type of a grout injection pipe or pipes that are utilized similar to the methods described. To describe all of the grout injection methods and variations is beyond the scope of this detailed description.

Pumping the grout requires great forces and imposes heavy side loads on the spacers 14. It follows that the spacers need to securely contain and mount the pipes and conduits of interest. The spacers are typically made from plastic and are relatively thin, typically ½ to ¾ of an inch (1.3 cm to about 1.9 cm) if they are fabricated from PVC or HDPE, and typically 3/16 to ¼ inch (0.48 cm to about 0.64 cm) if they are fabricated from steel, although some are as thin as ⅛ inch (0.32 cm) and others as thick as 1 inch (2.5 cm). As depicted in FIG. 1A-1B, one way to add strength to the spacers, and to help prevent horizontal movement, is to use them in pairs, i.e., as double-wall spacers, as shown. Instead of a single perforated sheet of plastic, spacers typically use two sheets that are substantially identical, the spacers secured to each other by bushings that space the sheets apart and simultaneously hold them together. This adds considerable stability to the spacers. The additional width in the direction of the conduits or cables helps prevent turning and bending, as well as longitudinal movement of the spacers. Keeping the spacers in place helps to ensure that the conduits have equal separation throughout the installation, and the power and communications cables suffer no deterioration.

Figure 2:
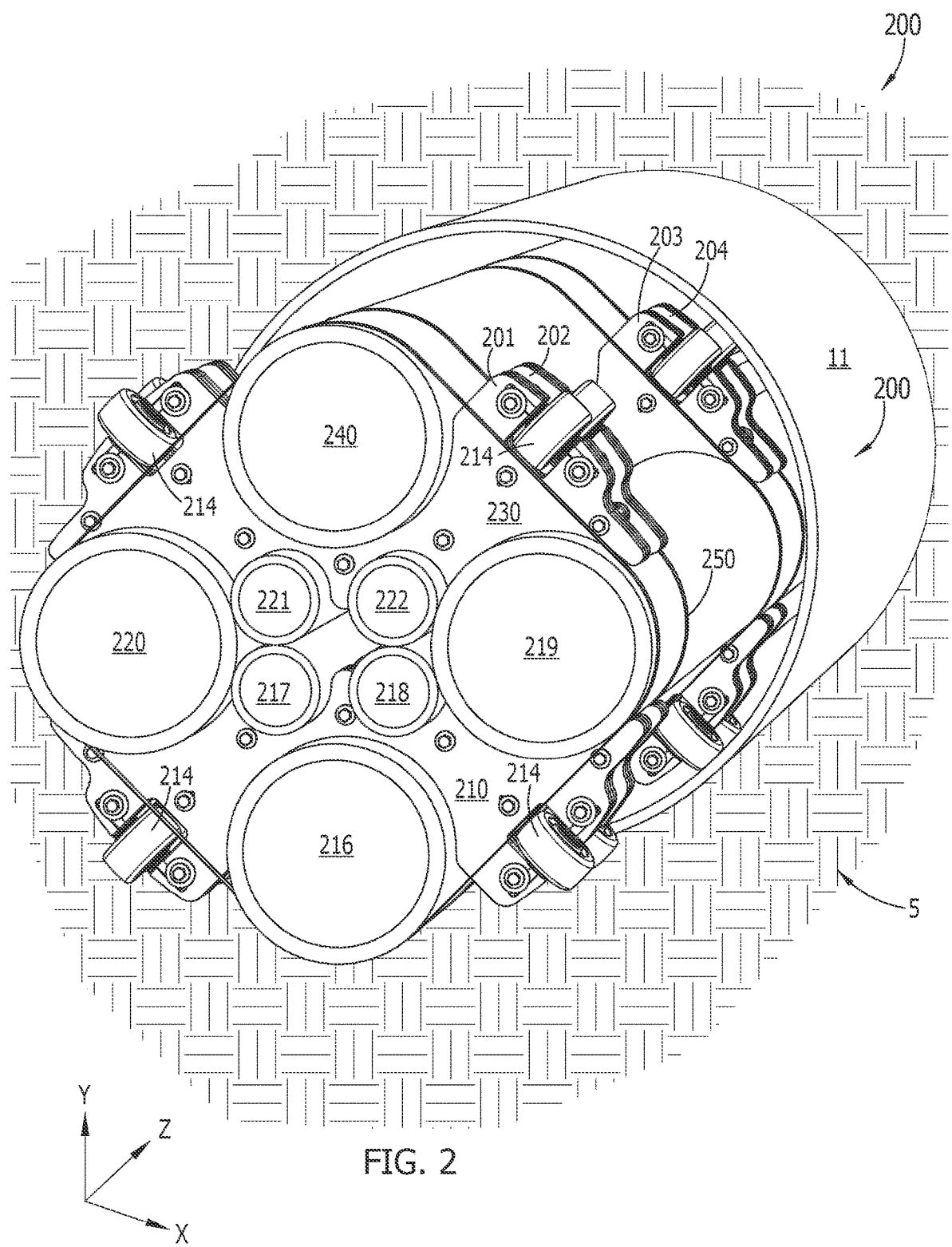
FIG. 2 depicts a perspective view of a double-wall spacer in an underground installation.

Duct spacers or bore spacers according to the present disclosure are used in the underground installation depicted in FIG. 2. A tunnel has been bored in the earth 5 and a casing 11, made of concrete, pipe or large-diameter conduit, is used to house a duct bank 200. The duct bank includes the conduits shown, and also include a plurality of spacers 201, 202, 203, 204 used to contain and protect the duct bank. Spacers 201-202 and spacers 203-204 each comprise a double-wall spacer, as will be described. Spacer 201 includes a lower half 210 and an upper half 230. Each of the upper and lower halves include two wheels 214 mounted on the spacers. The lower half 210 nestles or supports first lower conduit or duct 216 and smaller conduits or ducts 217, 218. First half 210 also supports conduits 219, 220, which may be the same size as conduit 216 or may be different. Additional smaller conduits 221, 222 rest atop supported conduits 217, 218 and are snugged in by upper half 230. The upper half 230 also nestles conduits 219, 220 and supports final conduit 240. Thus, the upper and lower halves 210, 230 both cooperate to support conduits or ducts 219, 220. Once the duct bank 200 is assembled, banding 250 is used around the duct bank, conduits and spacers, to tie the duct bank together.

Figure 3:
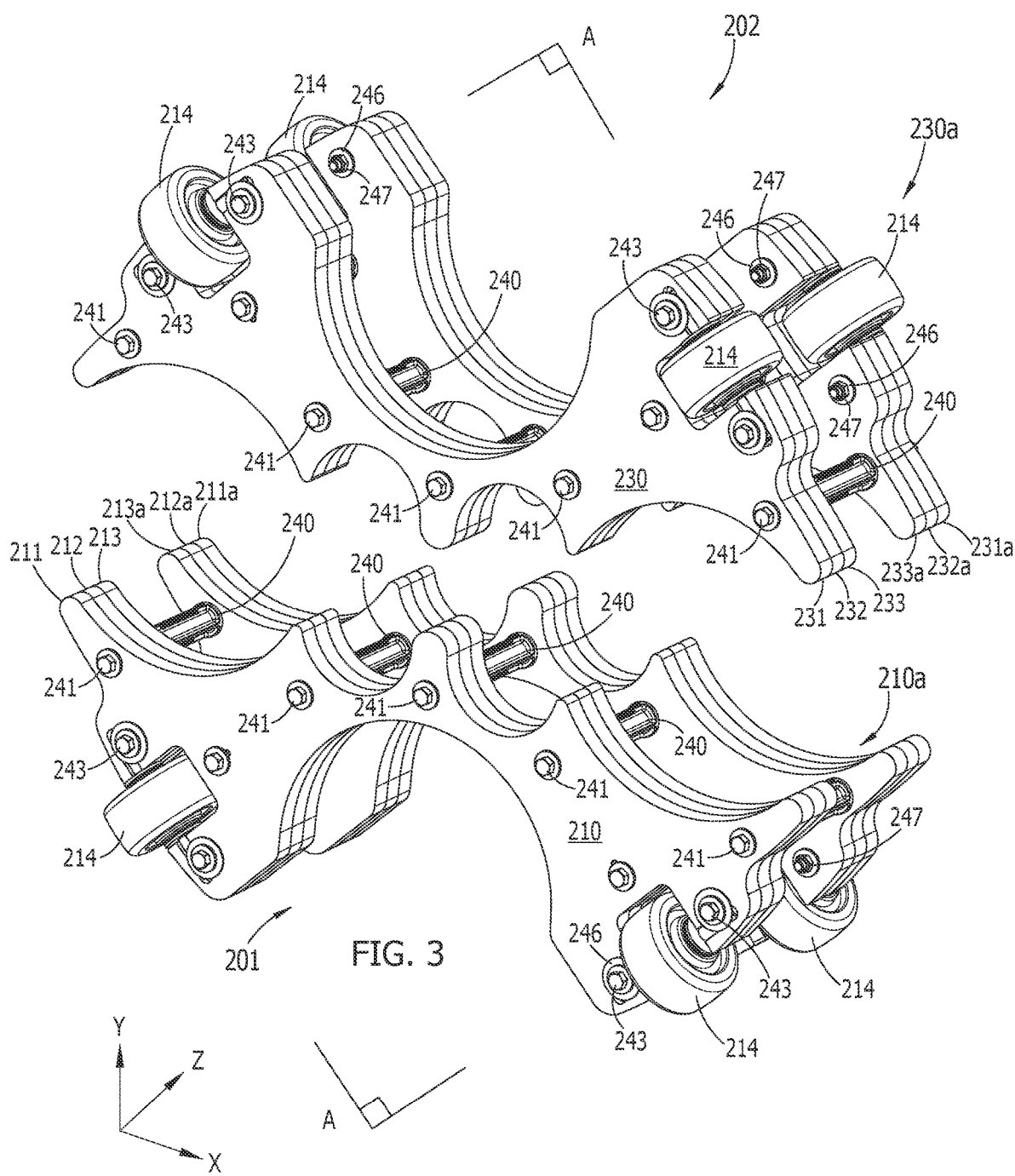
FIG. 3 depicts a double-wall spacer as it appears without conduits or ducts.

An exploded view of the double-wall spacers 201-202 is presented in FIG. 3. Front lower half 210 is seen to comprise three laminae, 211, 212, 213, snugged together with fasteners 243. Outer (front) lamina 211 is different from inner laminae 212, 213, because outer lamina 211 mounts wheels 214 on opposite sides of the lamina. As shown by angle A, the two wheels on lamina 211 are mounted at about 90° to each other. While a right angle of 90° is preferred, it has been found acceptable that the wheels, in an assembled duct bank, will function if the angles are from 80° to about 100°. Any particular lamina or bound group of laminae may be relatively inflexible and the wheels will remain at the angle fixed by the individual lamina. When combined with other spacers and ducts or pipes into a duct bank assembly, however, there can be variation among the four angles that combine to form a 360° assembly. These natural variances can be tolerated, so long as the individual angles are within the bounds of about 90°±10°, that is within the bounds of about 80° to about 100°.

In addition to the three laminae discussed, rear lower half 210a includes three additional laminae, 213a, 212a and 211a, mounted as seen, with outer lamina 211a also mounted on the outside (backside) of the spacer. Additional laminae 211a, 212a and 213a are identical with laminae 211, 212 and 213, that is, lamina 211 is identical to lamina 211a, and laminae 212, 213, 212a and 213a are all identical in this embodiment. As noted above, the outer laminae, 211 and 211a, are different because they are each adapted to mount wheel 214. The laminae are held together with spacer bushings 240 and long-bolt fasteners 241. Not all the spacer bushings can be seen in FIG. 3, but each double-wall spacer, in this embodiment, may have fourteen spacer bushings, seven each for the top and bottom halves, 210, 230.

Front upper half 230 is identical with lower half 210, but is inverted in use, as shown. Front upper half 230 includes three laminae, 231, 232, 233, while rear upper half 230a includes three laminae 231a, 232a, 233a. Outer lamina 231 is different from inner laminae 232, 233, because outer lamina 231 mounts wheels 214 on opposite sides of the lamina. As shown by angle A, the two wheels on each lamina 231 are mounted at about 90° to each other. The two sets 230, 230a may each be held together with fasteners 243, washers 246 and nuts or nylon locking nuts 247. The washers may be lock-washers. The laminae are then assembled using spacer bushings 240 and long-bolt fasteners 241. The wheels on each of the sets of laminae are mounted at about 90° to each other. In practice, the placement of the wheels on the periphery of the duct bank forms four angles that may vary between eighty degrees and one hundred degrees, rather than four ninety-degree angles.

Figure 4:
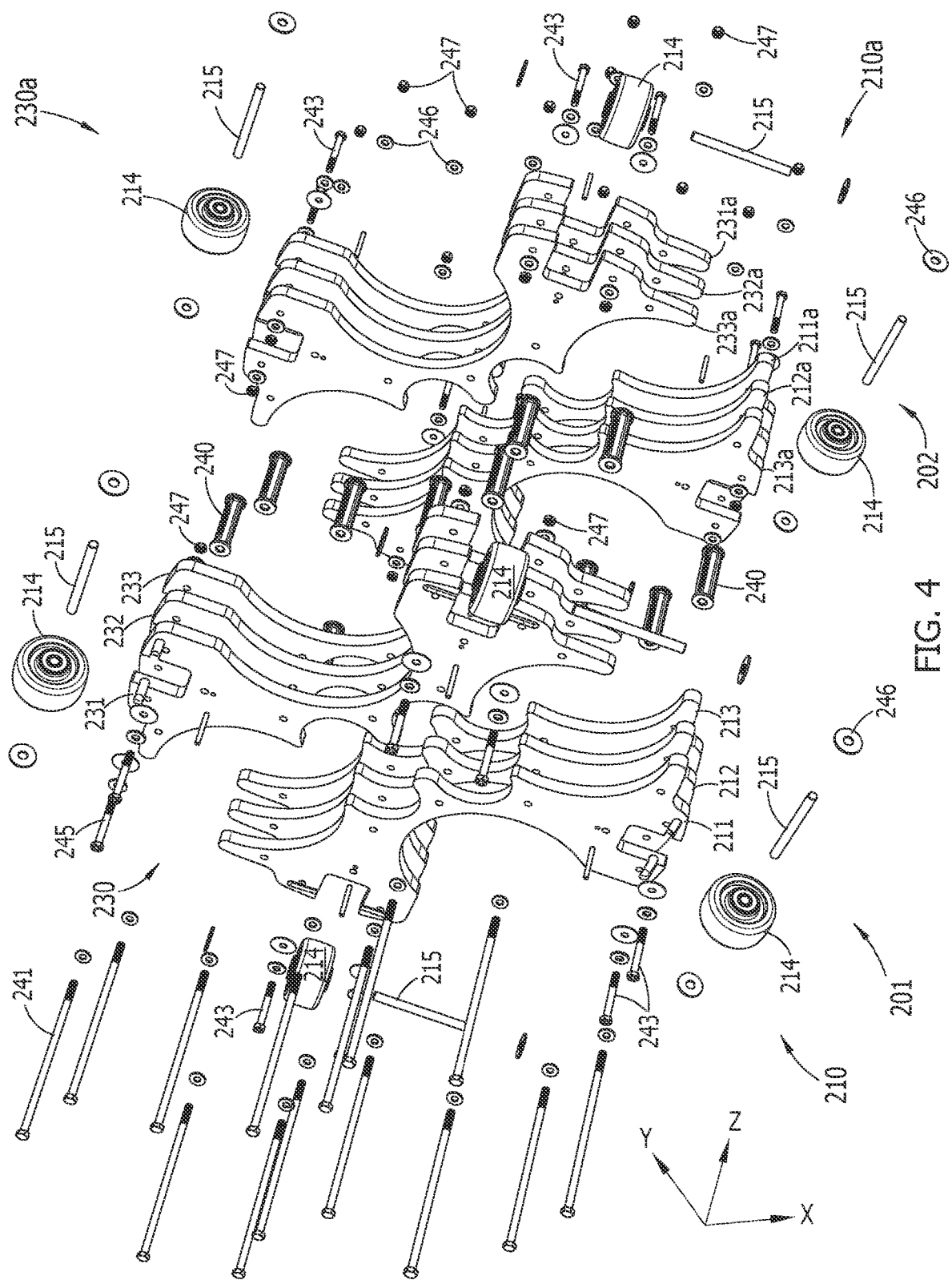
FIG. 4 depicts an exploded view of the double-wall spacer of FIG. 3.

The exploded view of FIG. 4 depicts a birds-eye view of how the many components of the double-wall spacer fit together. Front lower half 210 includes laminae 211, 212, 213, and rear lower half 210a contains their identical counterparts, 213a, 212a, 211a. Outer laminae 211 and 211a may each mount two wheels 214 on axles 215, the axle mounted to the outer lamina. For the front upper half 230, there are a first three laminae, including outer laminae 231 and inner laminae 232, 233. There is also a second set 230a of three laminae, including outer lamina 231a and two identical inner laminae 232a and 233a. The outer laminae, 231, 231a each mount two wheels 214 on axles 215 mounted to the outer laminae. As noted previously, the two wheels on any given lamina are mounted at about a 90° angle to each other. There are thus four sets of laminae, upper laminae 230, 230a and lower laminae 210, 210a. The two sets of three laminae may be secured together with short bolts 243, washers 246 and nuts or nylon locking nuts 247. The double-wall spacer, 201-202 is then assembled using spacer bushings 240 (fourteen each) with long bolts 241. Keeping the wheels perpendicular to each other ensures that the finished duct bank will be able to move forward and maneuver in its casing or conduit using its wheels when the duct bank is installed in the casing.

Figure 5A:
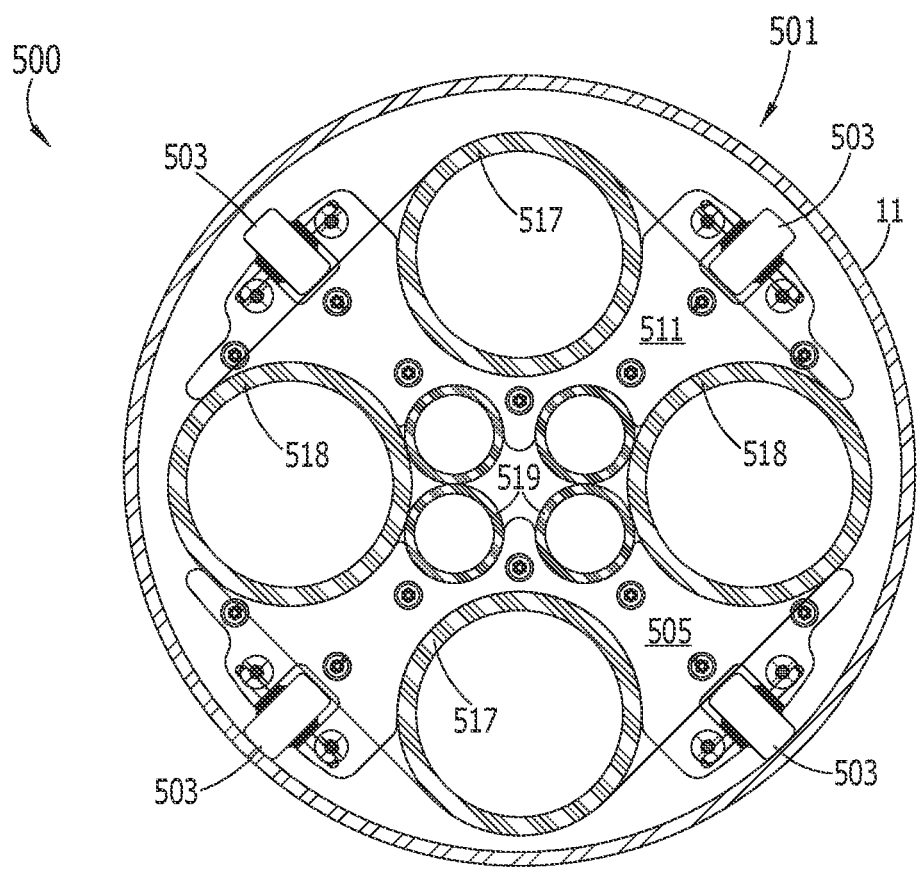
FIG. 5A depicts a single-wall spacer in a casing.
Figure 5B:
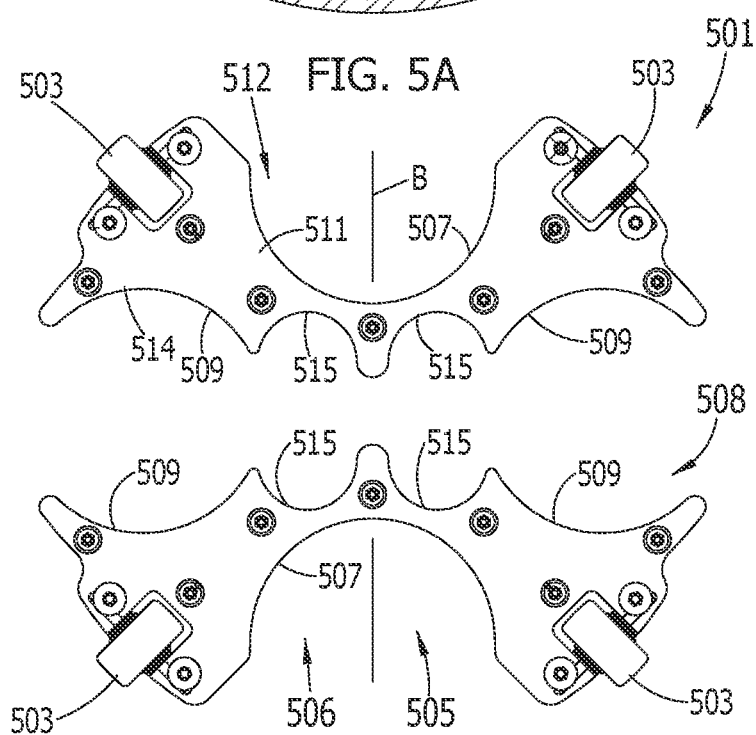
FIG. 5B depicts the two halves of the single-wall spacer of FIG. 5A.

FIGS. 5A and 5B depict a duct bank 500 made with a single wall spacer according to the present disclosure. FIG. 5A depicts duct bank 500 and single-wall spacer 501 in casing 11. Single-wall spacer 501 includes a bottom half 505 and a top half 511, the top half and the bottom halves each including two wheels 503, the two wheels mounted at 90° to each other. The top and bottom halves 505, 511 each include one lamina or more than one laminae, as described above in other embodiments. The single-wall spacer holds and spaces a plurality of ducts or conduits. In this embodiment, these include large conduits 517, 518 (two each) of a first diameter and four small conduits 519 of a second, smaller diameter. While it may be easier to accommodate diameters that are equal, other embodiments of this disclosure may accommodate conduit diameters that are different. In general, the outer diameter of the duct bank will be set by the spacers and their wheels, which are always on the periphery of the spacers and thus on the periphery of the duct bank. The pipes or ducts are spaced so that their outer surfaces are not on the periphery, because these outer surfaces would interfere with movement of the duct bank within the casing. Thus, an outer diameter of the duct bank is set by the spacers and their wheels; the outer surfaces of the pipes or ducts on the periphery of the duct bank may also form a ducting or piping outer diameter, but this is always less than the outer diameter of the duct bank itself, which is set by the spacers and their wheels.

FIG. 5B depicts an exploded view of single-wall spacer 501, which includes bottom half 505 and top half 511. In this embodiment, the top and bottom halves are identical, except that their orientation is reversed for assembly into a duct bank. Bottom half 505 includes a first or bottom side 506 and an opposite or top side 508. First side 506 includes a first bore 507 and opposite side 508 includes two bores 509 and two additional bores 515. Bores 507 and 509 are adapted to accommodate a same size larger conduit, while bores 515 are adapted to accommodate smaller size conduits, which may be the same size or may be different sizes. Other combinations of bore sizes may be used. Wheels 503 on each half are intended to be oriented perpendicular to each other for easy travel through casing 11. Top half 511 also includes two sides, first side 512 and opposite side 514. First side 512 includes a first bore 507 and opposite side 514 includes two bores 509 and two additional bores 515, in which bores 507 and 509 are adapted to accommodate a same size larger conduit, while bores 515 are adapted to accommodate smaller size conduits, which may be the same size or may be different sizes. More will be said later about vertical line of symmetry B.

Figure 6A:
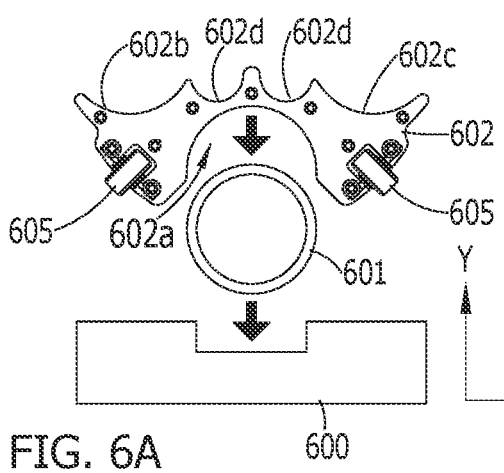
FIGS. 6A-6F depict stages of assembly of a single wall spacer according to the present disclosure.
Figure 6B:
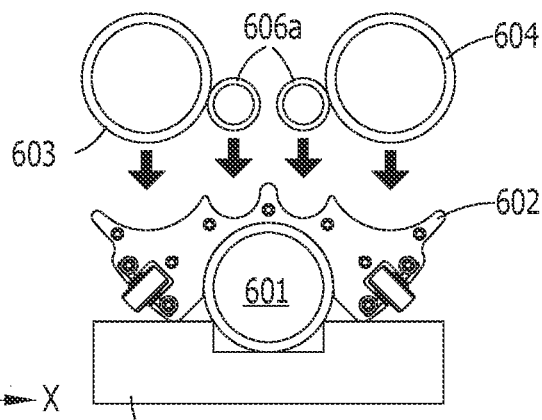
Figure 6C:
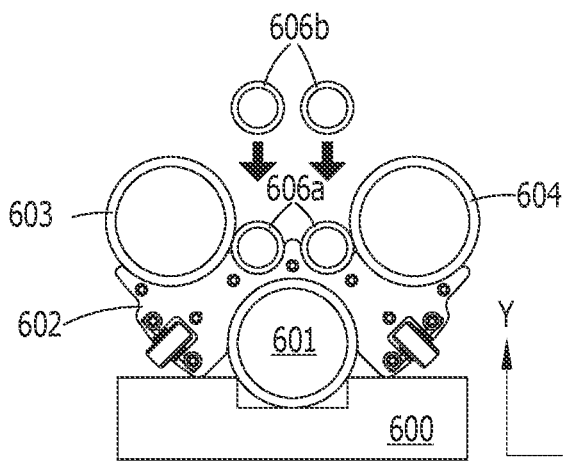
Figure 6D:
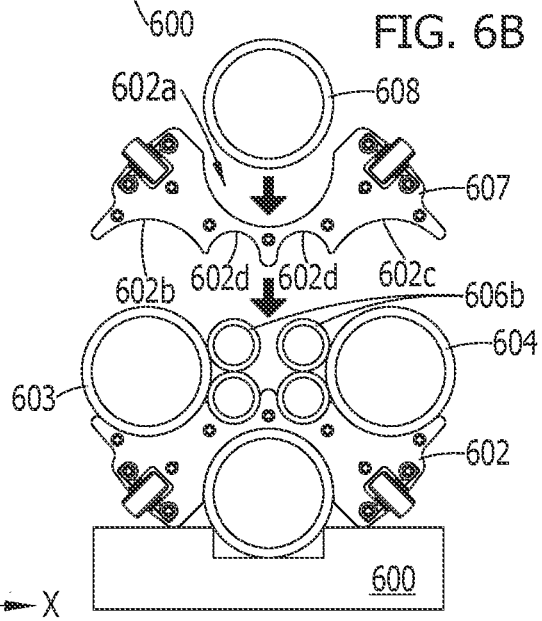

Once the spacers are available, the duct bank may be assembled. FIGS. 6A-6F depict one way to assemble the duct bank using spacers according to the present disclosure. FIG. 6A depicts a fixture 600 for holding a first duct or conduit 601. A lower half 602 of a duct spacer, with wheels 605, according to the present disclosure is then placed atop conduit 601, so that a suitably-sized bore 602*a* on the under-side of lower half 602 accommodates conduit 601. In FIG. 6B, lower half 602 rests on fixture 600 and conduit 601, while larger conduits 603, 604 are placed into bores 602*b*, 602*c* of the lower half. In addition, smaller ducts 606*a* are placed into bores 602*d* on the top side of lower half 602. In FIG. 6C, additional smaller-diameter conduits 606*b* are then placed atop conduits 606*a*. When the assembly is steady, assembling then progresses to FIG. 6D. Here, a top half 607 of the duct spacer is added, with its underside bores 602*b*, 602*c* and 602*d* fitting or accommodating already-installed conduits 603, 604, 606*b*.

Figure 6E:
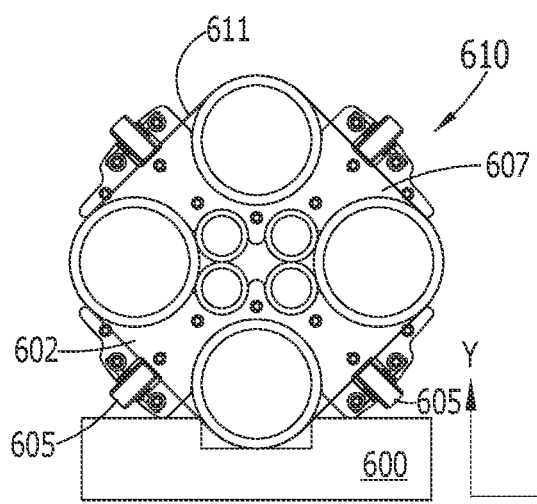
Figure 6F:
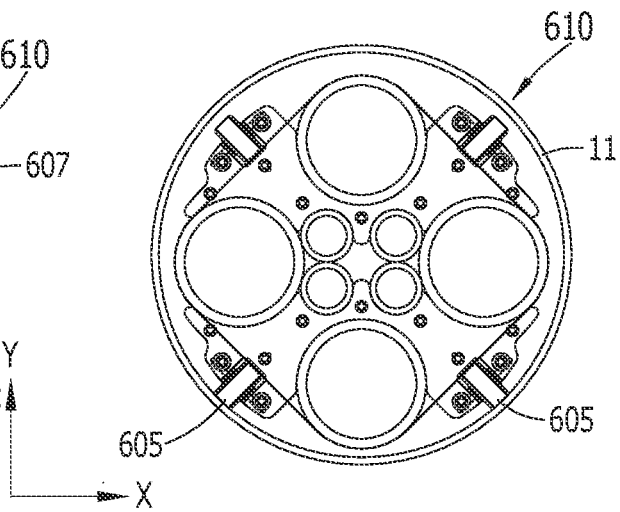
Figure 7B:
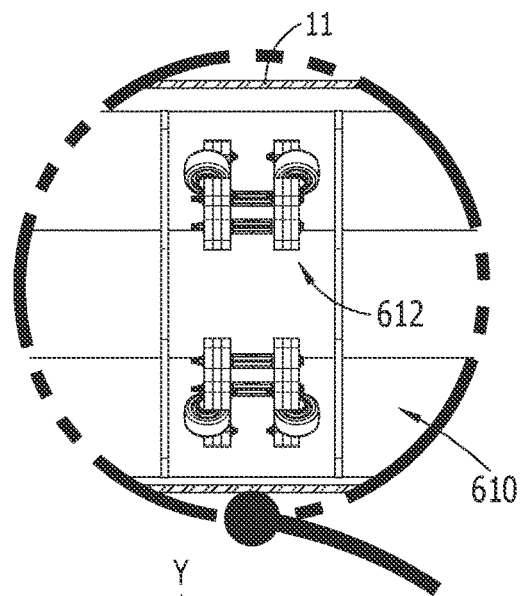
FIGS. 7A-7C depict views of a duct bank in buried casing, the ducts separated by spacers according to the present disclosure.
Figure 7C:
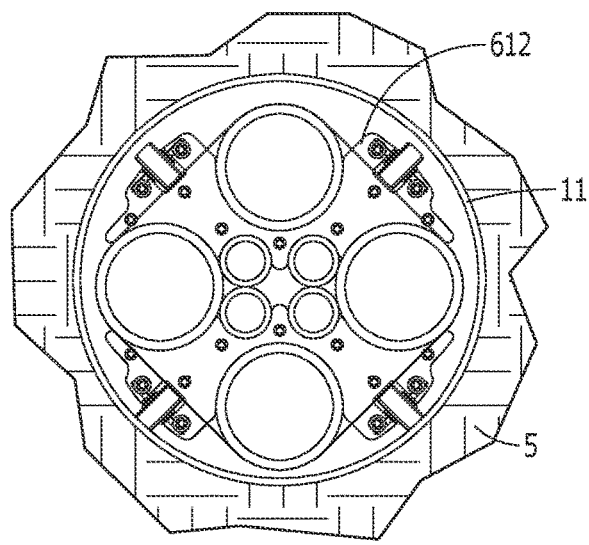
Figure 7A:
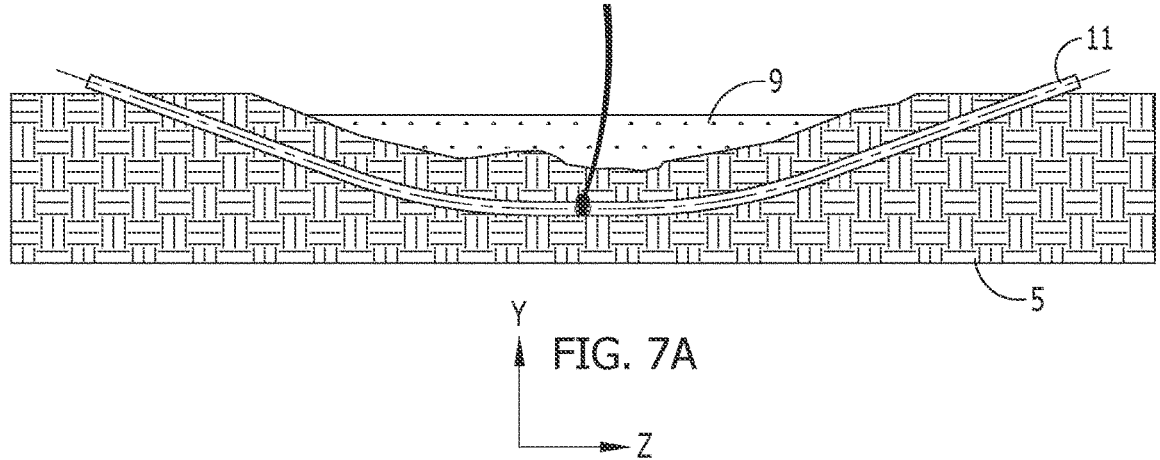

After top half 607 is added, an additional conduit 608 may be assembled into bore 602*a*. Note that lower half 602 is identical to upper half 607. Once assembly has been completed, as shown in FIG. 6E, banding 611 may be added to restrain the conduits and secure then in place. As shown in FIG. 6F, the duct bank 610 may then be wheeled into casing 11 using duct bank wheels 605. Other embodiments of duct spacers or bore spacers may accommodate different sizes of ducts or conduits. As shown in FIGS. 7A-7B-7C, the duct bank 610 may then be installed in casing 11. In this example, the earth 5 has been excavated or tunneled through, and casing 11 has been installed. The underground installation was evidently necessary to pass under a lake or river 9. FIG. 7A is an elevation view of the installation, while FIG. 7B depicts a plan (top) view of the duct bank 610 using a double-wall spacer 612. A cross-sectional view of the installation appears in FIG. 7C, depicting how the casing accommodates the double-wall spacer 612, while the double-wall spacer accommodates and spaces four large conduits and four small conduits. In other situations, conduit of dissimilar sizes may be used.

A method 80 of assembling a duct bank and installing it is also part of the present disclosure, as shown in the flowchart of FIG. 8. In one method, a bore spacer duct bundle is assembled, beginning by placing 81 a lower duct onto a fixture with a lower bore spacer, the lower side of the lower bore spacer accommodating the lower duct. This is the method depicted in FIG. 6A. After the lower duct and lower bore spacer have been placed, a first set of intermediate ducts is placed 82 atop the upper side of the lower bore spacer. Per FIG. 6B, this is the set of four ducts placed atop lower half 602. After this first set of four ducts, a second set of two intermediate ducts is then placed 83 atop the first set of intermediate ducts. In FIG. 6C, these are the two small ducts 606*b*. After these two ducts have been placed, the upper bore spacer is then placed 84 atop the two intermediate ducts, as shown in FIG. 5D, and then the top duct is placed 85 on top of the upper bore spacer. This forms a duct bundle or duct bank. The duct bank or duct bundle is then banded 86, as shown in FIG. 6E. Finally, the duct bundle with its bore spacers is then wheeled or run 87 into the casing, per FIG. 6F. It is understood that there are many additional embodiments of the spacers depicted above, in which the top and bottom halves of the spacers are identical. Other spacers may include bores for different sizes and make-ups of conduits or ducts.

Figure 9:
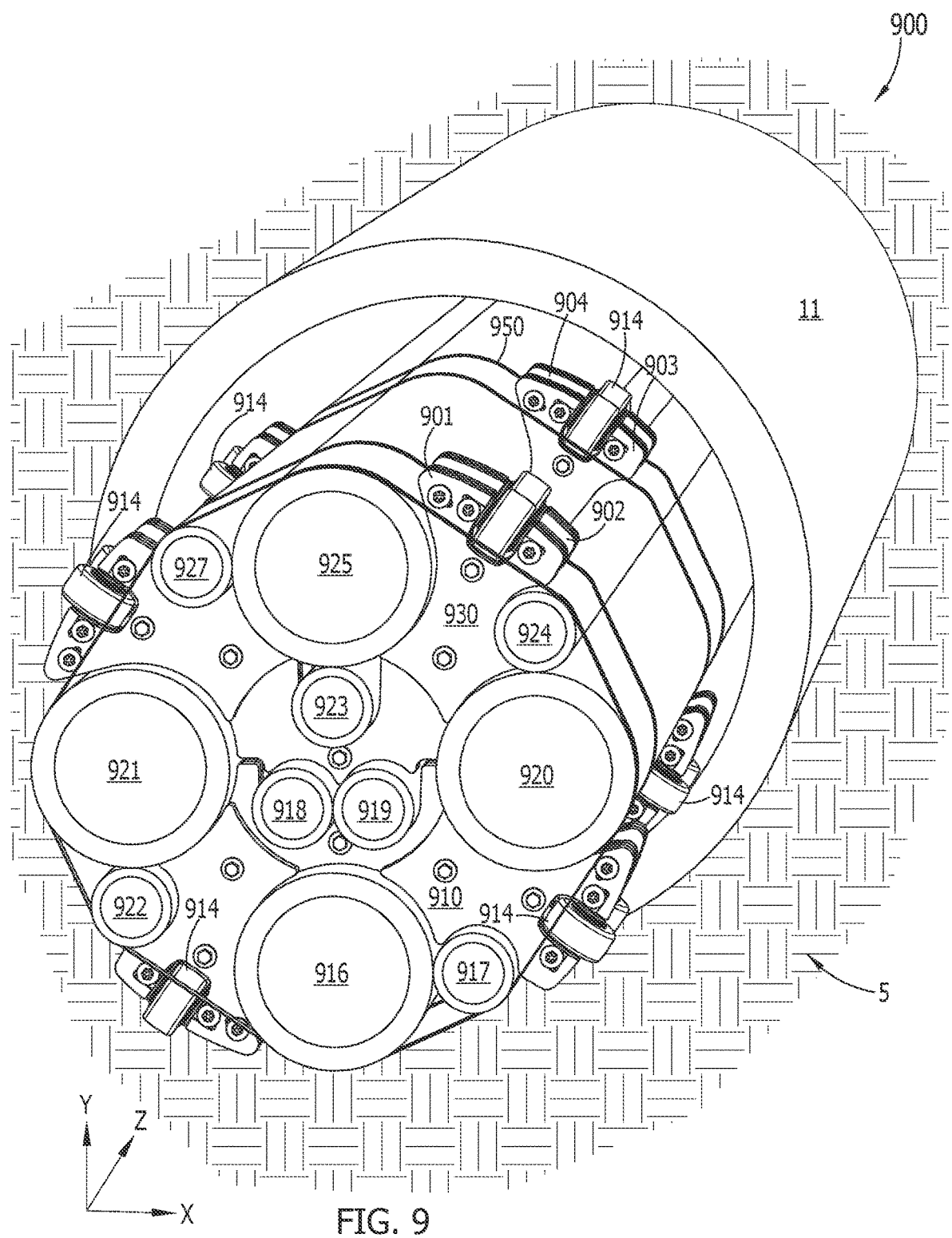
FIG. 9 depicts a perspective view of a double-wall spacer in an underground installation.

In another embodiment, the top and bottom halves of the spacers may be different, but the two halves nevertheless cooperate to bundle a plurality of ducts or conduits. One example is found in FIG. 9. A duct bank 900 comprises two double-wall spacers, 901-902 and 903-904, which include single wall spacers 901, 902, snugged together with bushings and fasteners, and 903, 904, along snugged together with bushings and fasteners. Each single-wall spacer includes a bottom half 910 and a top half 930. The top and bottom halves each include two wheels 914 mounted on opposite ends of each half, the two wheels oriented at about 90° to each other. Bottom half 910 rests upon larger conduit or duct 916 and smaller conduit or duct 917, which interface with a first or bottom side of bottom half 910. The opposite or top side of bottom half 910 nestles smaller conduits 918, 919. Bottom half top side also accommodates larger ducts 920, 921 on opposite sides of the bottom half, as well as smaller duct 922.

Top or upper half 930 also has two sides, a bottom side and a top or opposite side. When top half 930 is placed upon smaller conduits 918, 919, cut outs or bores on the bottom side nestle atop the smaller conduits 918, 919. The top half also nestles larger conduits or ducts 920, 921, again, on a first or bottom side of top half 930. The opposite or top side of top half 930 accommodates a first smaller conduit 923 and also a second or larger conduit 925 within suitably-sized cut-outs or bores of the top half 930. Additional bores accommodate two smaller conduits 924, 927. Altogether, the assembled bore spacer 901, with top and bottom halves 910, 930, help to bundle four large conduits and seven smaller conduits. Manufacturing and tooling are easier if the four large conduits are all the same size or diameter, and this also holds if the seven smaller conduits are all the same size or diameter. However, the spacers may be designed for differently-sized ducts or conduits.

Figure 10:
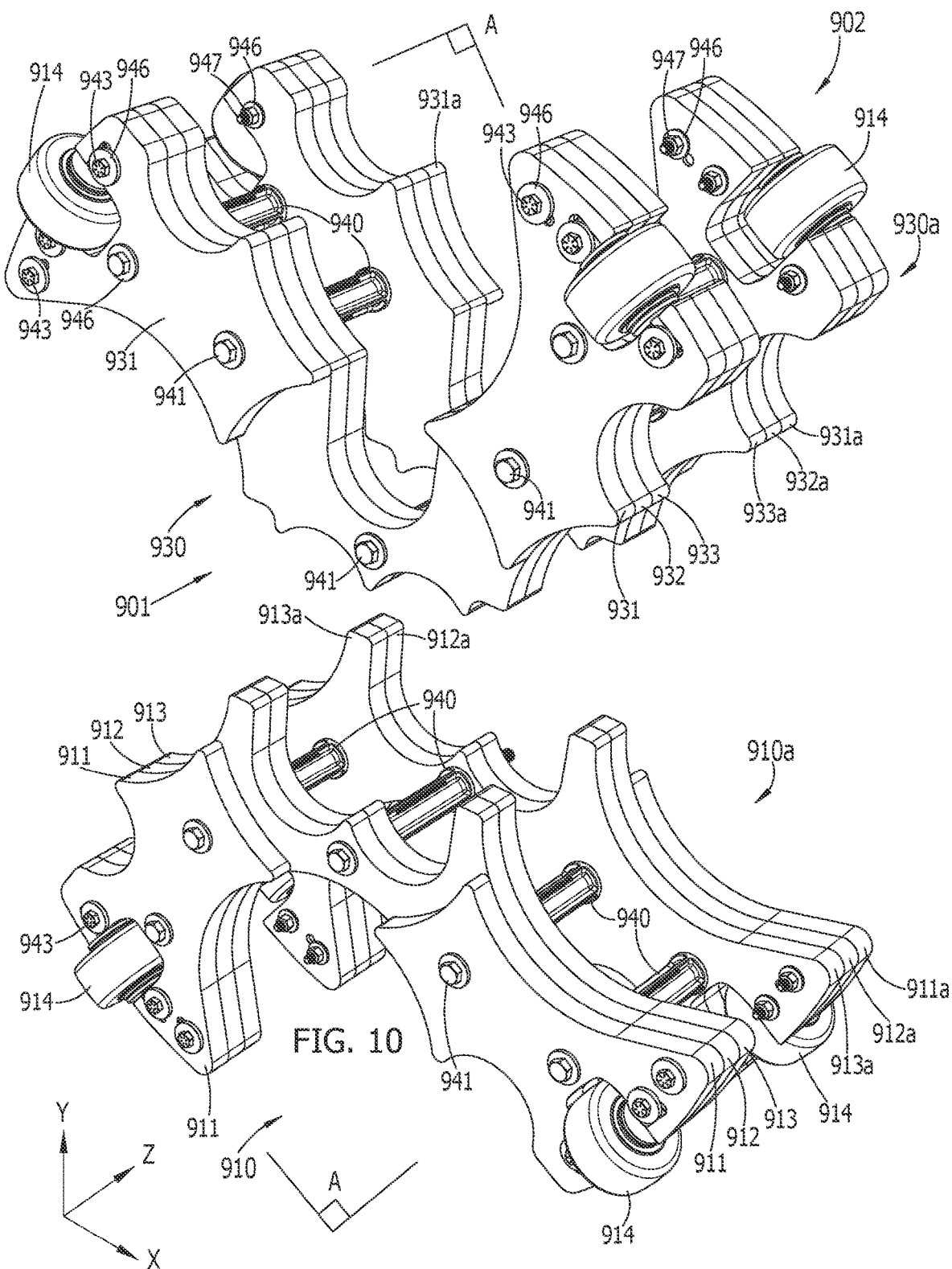
FIG. 10 depicts a second embodiment of a double-wall spacer as it appears without conduits or ducts.

A more detailed view of the double wall spacer 901-902 presents in FIG. 10. Spacer 901, the front portion of FIG. 10, includes a bottom or lower half 910 and an upper half 930; spacer 902, the back portion of FIG. 10, also includes a bottom or lower half 910a and a top half 930a. Front spacer 901 and back spacer 902 are joined by spacer bushings 940 and fasteners 941, 943, washers 946 and nuts 947, such as nylon locking nuts. Lock washers or other locking fasteners may be used. Each bottom half 910, 910a includes four laminae, 911, 911, 912, 913, or 913a, 912a, 911a, 911a. Bottom halves 910, 910a each include two of outer lamina 911 or 911a (second outer rear lamina 911a not visible in FIG. 10), since this lamina lacks a central portion. In addition, note that lamina 911 is additionally different from laminae 912, 913. Each of the two front laminae 911 have provisions for mounting a wheels 914. When the wheels are mounted to each one the two wheels will be at right angles to each other for rolling along the sides of the casing into which the duct bundle is placed. The same holds true for rear laminae 911a. Front laminae 911 are also different because they lack a central portion and thus lack bores in the middle 1108c which are present in laminae 912, 913 (see FIG. 12B). When the spacers 901-902 are joined to form a double-wall spacer, the order of the laminae are reversed. Thus, in back half lower portion 910a, the two laminae 911a, very similar to laminae 911, also each mount a wheel 914, so that the two wheels 914 so mounted, are also perpendicular to each other, and are on the backside, that is the out-side of the double-wall spacer 901-902. The two laminae, 911 and 911a are identical except for the mounting of the wheel 914. Front laminae 911 may have a front slot cut into them for mounting an axle for the wheel. If front lamina 911 were to be mounted in the place of rear lamina 911a, the slot would face lamina 912a and would not face the outside (the rear side) of spacer 902. This is a very subtle difference. Even though laminae 911 and 911a are very similar, the slot would not be the same. Thus, laminae 911 and 911a are very similar but are not identical. It is fair to say that laminae 911 and 911a are substantially similar.

This also holds for the upper halves 930, 930a. Front upper half 930 includes four laminae, two front laminae 931 and internal laminae 932, 933. Rear upper half 930a also includes four laminae, rear outer lamina 931a (second outer rear lamina not visible in FIG. 10) and internal laminae 932a, 933a. Laminae 931 and 931a are almost identical, as discussed above for laminae 911 and 911a. A slot on the outside of the laminae will be on a front face of laminae 931 and on the opposite face of rear lamina 931a. Internal laminae 932, 932a, 933 and 933a are identical. Note that lamina 931 is additionally different from laminae 932, 933. Each front lamina 931 (and rear lamina 931a) has provisions for mounting a wheel 914. When the wheels are mounted to the two laminae, 931-931 or 931a-931a, the wheels will be oriented at right angles to each other, for rolling along the sides of the casing into which a duct bundle is placed. Front lamina 931 (and rear lamina 931a) are also different because they lack a central portion and thus lack bores 1116c in the middle which are present in laminae 932, 933 (see FIG. 12B). The two sets of laminae 930, 930a may each be held together with fasteners 943, washers 946 and nylon locking nuts or nuts 947. The washers may be lock-washers, and other hardware may be used. The two sets 930, 930a are then assembled using spacer bushings 940 and long-bolt fasteners 941. The wheels on each of the sets of laminae are mounted at about 90° to each other.

Figure 11:
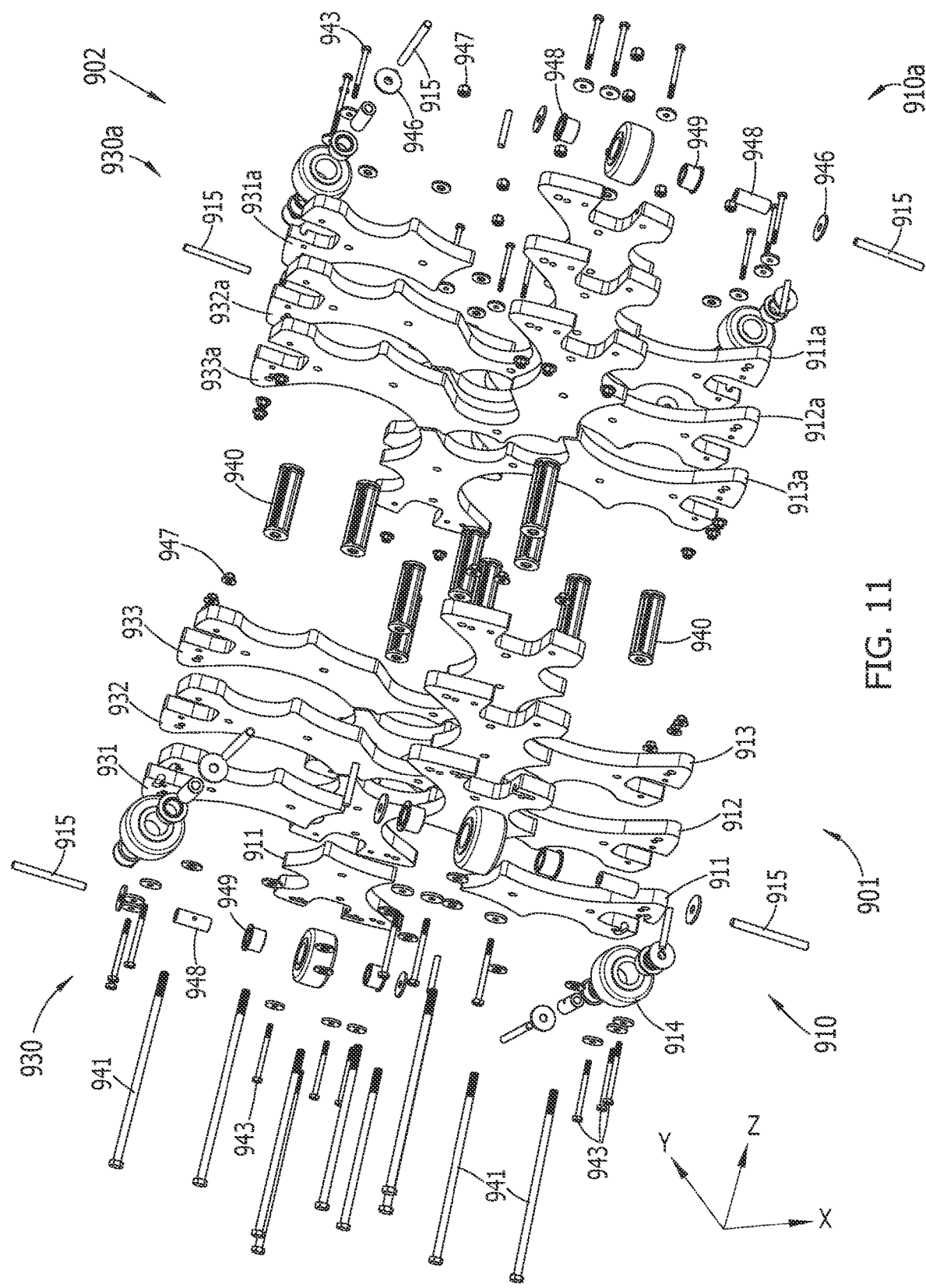
FIG. 11 depicts an exploded view of the double-wall spacer of FIG. 10.

The exploded view of FIG. 11 depicts a birds-eye view of how the many components of the double-wall spacer fit together. The exploded view includes front and rear spacers 901, 902, and includes their lower halves 910, 910a and upper halves 930, 930a. Front lower half 910 includes laminae 911 (two each of lamina 911), 912, 913, while rear lower half 910a includes their substantially identical or identical counterparts, 913a, 912a, 911a (two each of lamina 911a, only one visible in the FIG. 11). Outer laminae 911 and 911a may each mount a wheel 914 on an axle 915, the axle mounted to the outer laminae, 911, 911a. When mounted, the two wheels on laminae 911-911 and on laminae 911a-911a will be perpendicular to each other. For the front upper half 930, there are also four laminae, including two outer laminae 931 and two inner laminae 932, 933. Rear upper half 930a also includes a set of four laminae, including two outer lamina 931a and two identical inner laminae 932a and 933a. The outer laminae, 931, 931a each mounts wheel 914 on an axle 915 mounted to the outer lamina. Bushings 948 and end caps 949 may also be used to mount the axles and wheels. As noted previously, the two wheels on any given set of the outer laminae are mounted at about a 90° angle to each other. The two sets of four laminae may then be secured together with short bolts 943, washers 946 and nuts 947. The double-wall spacer is then assembled using spacer bushings 940 (ten each) with long bolts 941. Keeping the wheels perpendicular to each other ensures that the finished duct bank will be able to move forward and maneuver in its casing or conduit when the duct bank is installed in the casing.

As noted above, any particular lamina or bound group of laminae in this embodiment may be relatively inflexible and the wheels will remain at the angle fixed by the individual lamina or laminae, that is, at a 90° angle. When combined with other spacers and ducts or pipes into a duct bank assembly, however, there can be variation among the four angles that combine to form a 360° duct bank assembly. These natural variances can be tolerated, so long as the individual angles are within the bounds of about 90°±10°, that is within the bounds of about 80° to about 100°. In this embodiment, for example, the angles of the two 911 laminae in bottom half 910 will be fixed by their assembly into a group that also involves laminae 912, 913. This also holds true for the two 931 laminae of top half 930, and likewise for bottom half 910a and rear upper half 903a. When combined into double-wall spacer 901-902, however, the four angles about the periphery may vary from a desired 90° angle by as much as ±10 degrees.

Figure 12A:
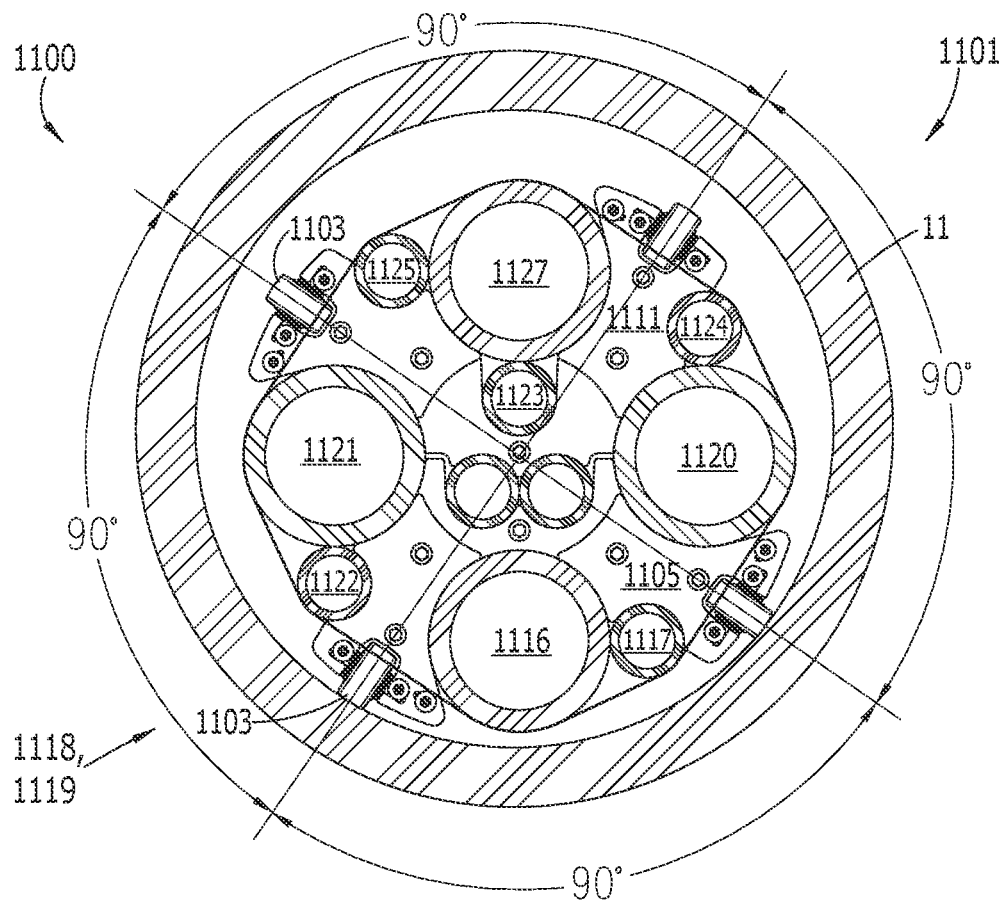
FIG. 12A depicts a single-wall spacer in a casing.
Figure 12B:
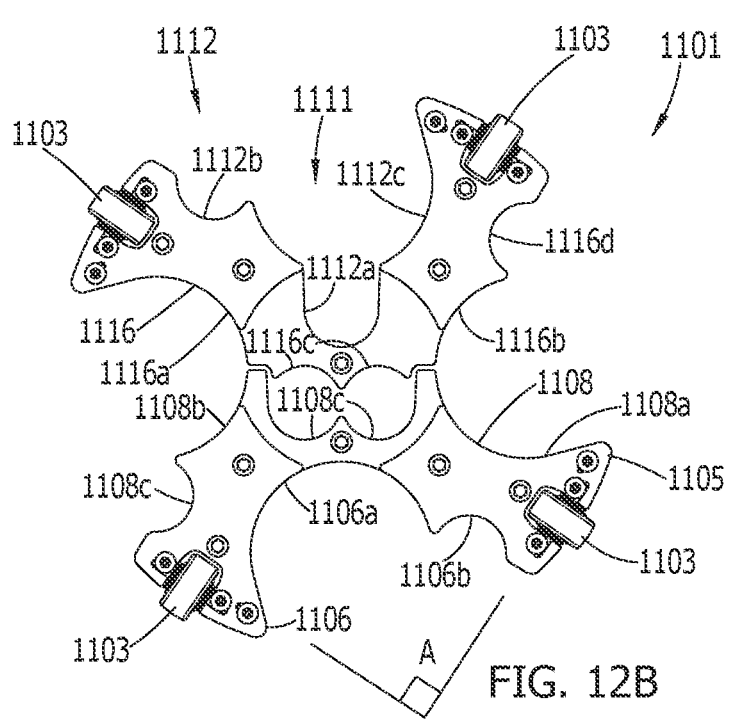
FIG. 12B depicts the two halves of the single-wall spacer of FIG. 12A.

FIGS. 12A and 12B depict a duct bank 1100 made with a single wall spacer according to the present disclosure. FIG. 12A depicts a single-wall spacer 1101 in casing 11. Single-wall spacer 1101 includes a bottom half 1105 and a top half 1111, the top half and the bottom half each including two wheels 1103. The top and bottom halves 1105, 1111 each include one lamina or more than one laminae, as described above in other embodiments. The single-wall spacer holds and spaces a plurality of ducts or conduits. In this embodiment, these include large conduits 1116, 1120, 1121, 1127 of a first larger diameter, or more than one diameter. The spacer also holds several smaller conduits 1117, 1118, 1119, 1122, 1123, 1124, 1125 of a second, smaller diameter, or of a variety of smaller diameters. While it may be easier to accommodate diameters that are equal, other embodiments may accommodate conduit or ducts having diameters that are different from one another. Note the four ninety-degrees angles shown between the wheels. In practice, each of these may vary from eighty degrees to one hundred degrees, with the total angles around the periphery of the duct bank always summing to three hundred sixty degrees.

In general, the outer diameter of the duct bank 1100 will be set by the spacers and their wheels, which are always on the periphery of the spacers and thus on the periphery of the duct bank. The pipes or ducts are spaced so that their outer surfaces are not on the periphery, because these outer surfaces would interfere with travel of the duct bank through the casing. Thus, an outer diameter of the duct bank is set by the spacers and their wheels; the outer surfaces of the pipes or ducts on the periphery of the duct bank may also form a ducting or piping outer diameter, but this is always less than the outer diameter of the duct bank itself, which is set by the spacers and their wheels. Note the dis-symmetry shown in FIG. 12A—the four 90° angles and their coordinate system center on the assembled duct bank, not on the casing. On the bottom of the duct bank, wheels 1103 make contact with the inner diameter of the casing 11, while pipes or ducts, such as 1116, 1117, 1120 and 1122 do not make contact with the casing.

FIG. 12B depicts an exploded view of single-wall spacer 1101, which includes bottom half 1105 and top half 1111, each of which may comprise several laminae or layers. In this embodiment, the top and bottom halves are not identical because of differences in the middle portions, as will become apparent. In addition, their orientation is reversed for assembly into a spacer and into a duct bank. Bottom half 1105 includes a first (bottom) side 1106 and an opposite (top) side 1108. First side 1106 includes a first bore 1106a, for a larger diameter conduit or duct and a smaller bore 1106b for a smaller diameter duct. Opposite side 1108 includes five bores. These include first larger bore 1108a and second larger bore 1108b, and also includes three additional smaller bores 1108c in the left side and center of the top side. Bores 1108a and 1108b are adapted to accommodate larger size conduits, which may be the same size or may be different sizes. Bores 1108c are adapted to accommodate smaller size conduits, which may be the same size or may be different sizes. Other combinations of bore sizes may be used. Wheels 1103 on each half are intended to be oriented perpendicular to each other, see Angle A, for easy travel through casing 11. Top half 1111 also includes two sides, first (top) side 1112 and opposite (bottom) side 1116. First side 1112 includes a first smaller bore 1112a, a second smaller bore 1112b and a larger-size bore 1112c. Bottom or opposite side 1116 includes two larger-size bores 1116a and 1116b and also includes space for two additional smaller-sized bores 1116c, spaced closely together, and a third smaller-sized bore 1116d. Bores 1116a, 1116b and 1112c are sized to accommodate a same size larger conduit, while bores 1112a, 1112b, 1116c and 1116d are adapted to accommodate smaller size conduits, which may be the same size or may be different sizes. Note how bores 1108a and 1116b cooperate to hold a single larger-sized conduit; bores 1108b and 1116a also cooperate to hold a single larger-sized conduit. Other combinations of bore sizes may be used.

Figure 13A:
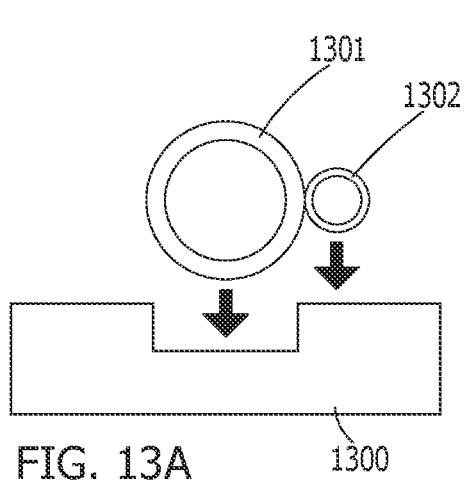
FIGS. 13A-13H depict stages of assembly of a single wall spacer according to the present disclosure.
Figure 13B:
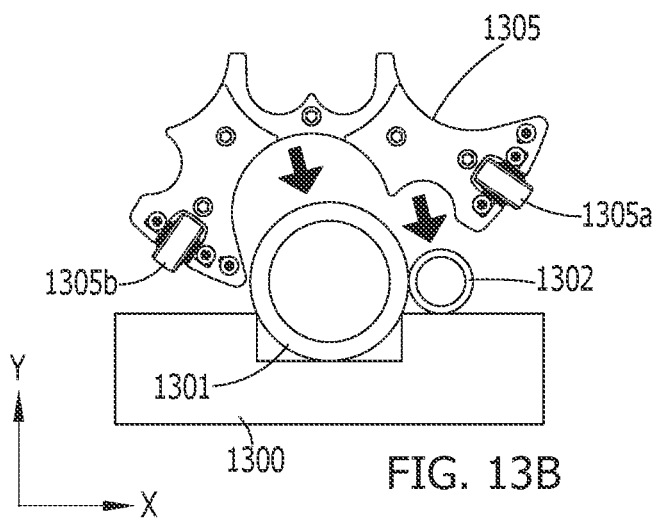
Figure 13C:
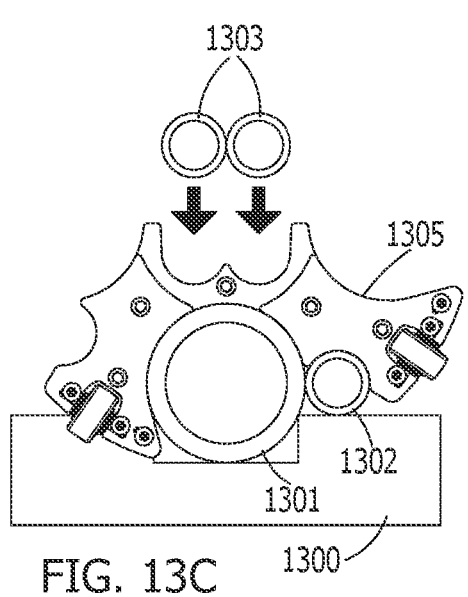
Figure 13D:
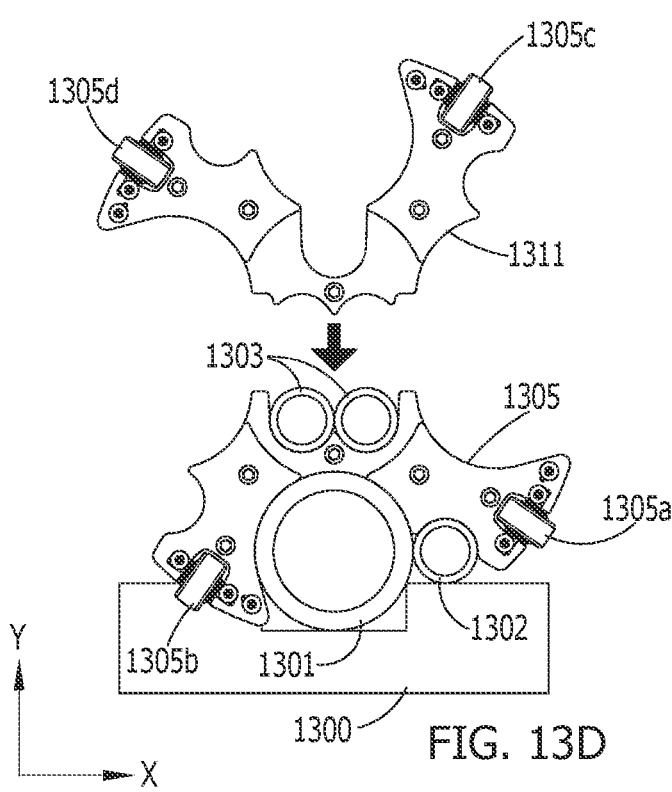
Figures 13E, 13F:
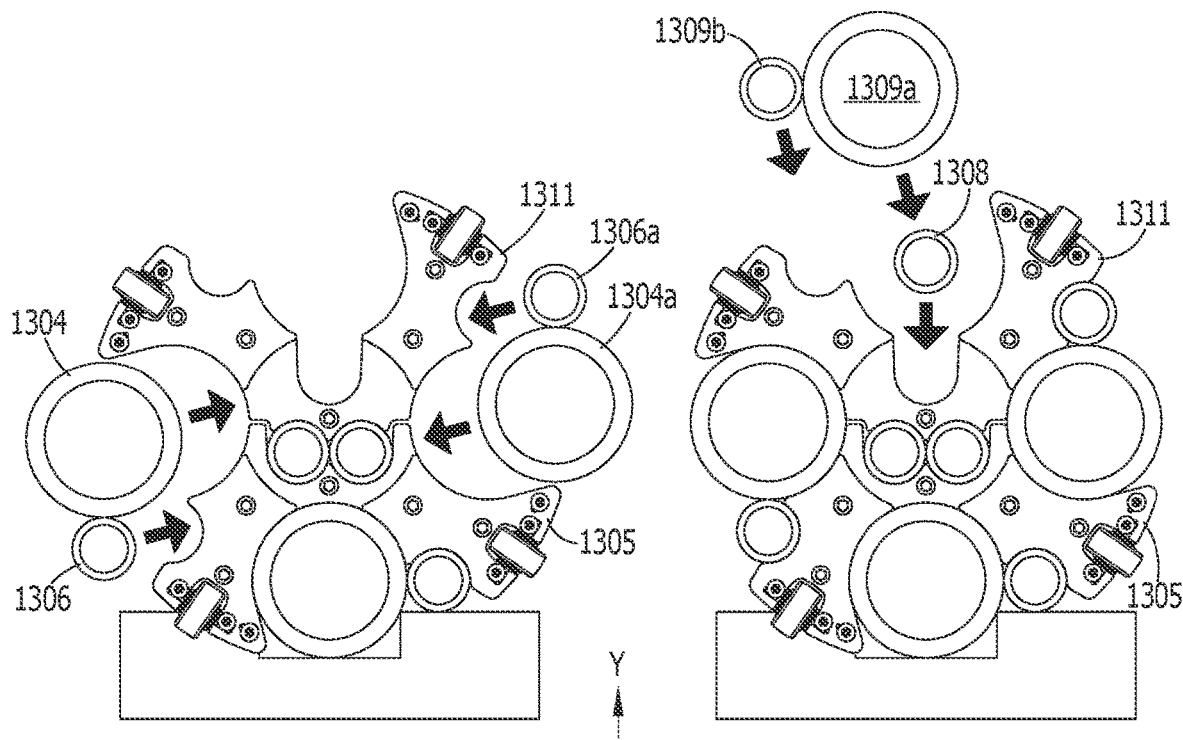

Once the spacers are available, the duct bank may be assembled. FIGS. 13A-13H help visualize how the assembly is accomplished. An assembly fixture 1300 may be useful. A first conduit 1301 and a second smaller conduit 1302 are placed into fixture 1300, as shown in FIG. 13A. A lower half 1305 of a single-wall spacer, with wheels 1305a, 1305b is then placed atop the conduits 1301, 1302, using the appropriate bores on the first or bottom side of the spacer for the conduits, per FIG. 13B. As then shown in FIG. 13C, two smaller conduits 1303 are then placed into the second or opposite side of the spacer lower half. As then shown in FIG. 13D, the top or upper half 1311 of the single-wall spacer, with wheels 1305c, 1305d is then placed atop conduits 1303. This places the first or bottom side of spacer 1311 in contact with conduits 1303. Side assembly of a plurality of conduits is then possible, as shown in FIG. 13E. The top side of lower half 1305 is adapted to accept conduit 1306 and the bottom side of upper half 1311 is adapted to accept conduit 1306a. As also shown in FIG. 13E, top and bottom halves 1311, 1305 cooperate to accept larger-diameter conduits 1304, 1304a. At least larger conduits 1304, 1304a may require some additional fixture or help to remain in place before banding takes place. Smaller conduit 1308 is then placed into the upper side of the upper or top half 1311, followed by larger-diameter duct or conduit 1309a and smaller-diameter conduit 1309b, as shown in FIG. 13F. The duct bank 1315 is then formed by securing the spacers and conduits with banding 1313, shown in FIG. 13G. Finally, the duct bank 1315 is rolled into casing 11 using the assembled duct bank and the wheels 1305a, 1305b, 1305c, 1305d of the spacers. Other embodiments of duct spacers or bore spacers may accommodate different sizes of ducts or conduits.

As shown in FIGS. 14A-14B-14C, a duct bank 1415 may then be installed in casing 11. Duct bank 1415 may be a double-wall version of duct bank 1315 using double-wall spacers 1412 instead of the single-wall spacers used for duct bank 1315. In this example, the earth 5 has been excavated or tunneled through, and casing 11 has been installed. The underground installation was evidently necessary to pass under a lake or river 9. FIG. 14A is an elevation view of the installation, while FIG. 14B depicts a plan view of the duct bank 1415 using a double-wall spacer 1412. The cross-sectional view of the installation appears in FIG. 14C, depicting how the casing accommodates the double-wall spacer 1412, while the double-wall spacer accommodates and spaces four large conduits and seven small conduits. In other situations, conduit of dissimilar sizes may be used.

Figures 13G, 13H:
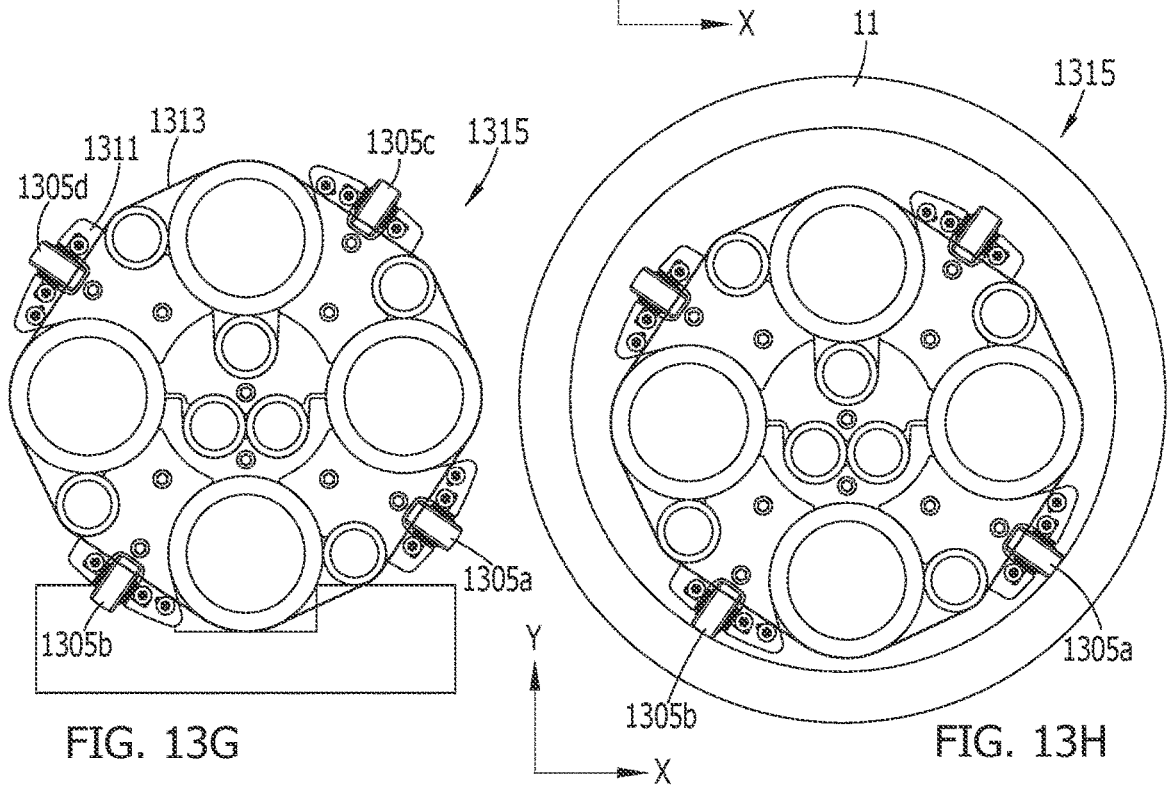

A method 150 of assembling a duct bank and installing it is also part of the present disclosure, as shown in the flowchart of FIG. 15. In one method, a bore spacer duct bundle is assembled, beginning by placing 151 two lower ducts onto a fixture with a lower bore spacer 152, the lower side of the lower bore spacer accommodating the lower two ducts, which may be the same size or may be different sizes, as shown in FIG. 13A. This is the method depicted in FIGS. 13A-13B. After the lower ducts and lower bore spacer have been placed, a first set of intermediate ducts is placed 153 atop the upper side of the lower bore spacer, as shown in FIG. 13C. The next step is to place 154 the upper bore spacer onto the first set of intermediate ducts, as shown in FIG. 13D. Then both outer sets of intermediate ducts are placed 155 between the upper and lower bore spacers, followed by placing 156 the upper ducts onto the upper bore spacer, as shown in FIGS. 13E-13F. This completes the components of the duct bundle or duct bank, at least for the portion of the ducts concerned with this particular spacer. The bundle is then banded 157, both sides, top and bottom, and wheeled 158 into the casing, using the wheels of the duct bank to traverse the sides of the casing. This is depicted in FIGS. 13G-13H.

As a rule, single wall spacers are more useful for smaller casings, such as those used for straight bores of 42 inches (107 mm) and smaller diameters. If the diameter is greater than 42 inches (107 mm) or if the bore is a directional bore, double-wall spacers should be used. As is clear, the double-wall spacers add a great deal more dimensional stability than a duct bank constructed with single-wall spacers is capable of. The conduits used may include rigid PVC, commercially available in diameters from about 1 inch to 12 inches (25 mm to 300 mm). Other options include HDPE, in diameters from 1 inch to 6 inches (25 mm to 150 mm) and fiberglass, from about ¾ inches to about 8 inches (20 mm to 200 mm). Other conduits may be used.

Spacing between halves of double-wall spacers may be as desired. For example, a distance of about 3-4 inches (about 8-10 cm) works well for dimensional stability during assembly, and for handling ease of the finished duct bank. Other distances may be used as desired. The introduction above to casings and spacers noted that grout may be used to embed a duct bank and protect the ducts and the duct bank. Note that the central portion of the duct bank described above, e.g., FIGS. 7C and 14C, have voids that allow grout to flow through the spacers. For example, in FIG. 7C, the central portion, with spaces between the four small conduits, will allow grout to flow through—see also FIG. 5A. In FIG. 14C, there are gaps at least on the periphery between the outer banding, the larger conduits and the smaller conduits—for this, see FIG. 12A.

This disclosure of multi-part bore spacers has many embodiments in addition to the few described herein. For instance, the spacers have been described and shown as routed from thermoplastic sheet materials, while they may be fabricated or molded from other materials, such as thermoset materials, wood, or other natural materials. Good shop practices should be observed when fabricating spacer and spacer laminae, for example, all corners should be rounded or radiused, including internal as well as external corners. Sharp edges should also be smoothed or beveled. This helps to avoid stress concentrators and contributes to longer lives for the spacers and the duct banks into which they are made. The spacers disclosed herein are different in that they have no center as such, and also have no top or bottom as such, in contrast to spacers according to the prior art. In the spacers disclosed herein, the conduits or ducts themselves occupy significant portions of the outer periphery of the duct banks.

The spacers disclosed herein also have unique symmetry, in that at least the peripheral portions of the spacers tend to have radial symmetry, wherein the central portions may have more variance. Thus, the spacers 505, 511 in FIG. 5B have 180-degree radial symmetry, reflective symmetry, since the top and bottom portions of the spacer are identical. In addition, each spacer itself has reflective symmetry, in that the left-and-right halves of the spacers 505, 511 are also equal, as shown by reflective line-of-symmetry B. In contrast, the spacers 901, 902 in FIG. 10 lack 180-degree symmetry because their central portions are not identical; note however, that the outer portions of the spacer, those defined by outer laminae 911, have symmetry, and indeed have a higher degree of symmetry, ninety-degree symmetry, since there are four substantially identical laminae in this construction.

The laminated reinforcements discussed above may retain axles for the wheels, but other reinforcements may be used and other devices provided in order to add reinforcements or wheels to the side-loading separators. For instance, metal or reinforced plastic shoes may be placed on ends of the arms and pinned in place by transverse pins in the arms. Bushings and fasteners have been described as providing ways to secure additional horizontal stability to the top-and-bottom spacer combinations, but there are additional ways to add stability to the assemblies. For instance, joining side-arms with additional securing points may be used. It is also possible to join two spacers with a fixed horizontal spacing by using clamps with flanges on the out-sides of both spacers. Such clamps could use fasteners through orifices in the clamps and the spacers, or could alternatively use latches that fasten on raised bosses or other surfaces of the spacers. The process has been described as loading conduits into spacers because this is the commercial practice, with the actual power or communications cables later pulled into the conduits. The process would also work if the cables themselves were assembled onto the spacers. The cables are much heavier than empty conduit, but assemblies with cables and the spacers described herein are also possible.

All references, including publications, patent applications and patents cited herein are hereby incorporated by reference to the same extent as if each reference were individually and specifically indicated to be incorporated by reference and were set forth in its entirety herein.

The use of the terms "a," "an," and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments are described herein, including the best mode known to the inventors for carrying out the disclosure. Variations of those preferred embodiments may become apparent to those of ordinary skill in the art upon reading the foregoing description. Skilled artisans will use such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A spacer, comprising:
a first spacer arm comprising a plurality of bores on a first side of the first spacer arm and at least one bore on a second side of the first spacer arm, the first spacer arm further comprising two transversely-mounted wheels on opposite ends of the first spacer arm; and
a second spacer arm comprising a plurality of bores on a first side of the second spacer arm and at least one bore on a second side of the second spacer arm, the second spacer arm further comprising two transversely-mounted wheels on opposite ends of the second spacer arm, wherein the first spacer arm and the second spacer arm each comprise a plurality of laminae.

2. The spacer of claim 1, wherein the first spacer arm and the second spacer arm are identical.

3. The spacer of claim 1, wherein the first spacer arm and the second spacer arm each comprise at least one additional spacer arm that is not identical with the first and second spacer arms.

4. The spacer of claim 1, wherein the first spacer arm and the second spacer arm thus comprise a first set of first and second spacer arms, and further comprising a second set of first and second spacer arms, the first sets of spacer arms assembled together and the second sets of spacer arms assembled together with a plurality of spacer bushings.

5. The spacer of claim 1, wherein the at least one bore on the second side of the first spacer arm and the at least one bore on the second side of the second spacer arm each comprise a plurality of bores.

6. The spacer of claim 1, wherein each of the first spacer arm and the second spacer arm comprise two halves.

7. The spacer of claim 1, wherein the first spacer arm and the second spacer arm laminae are not identical.

8. A spacer, comprising:
a first spacer arm comprising a plurality of bores on a first side of the first spacer arm and at least one bore on a second side of the first spacer arm, the first spacer arm further comprising a first set of two transversely-mounted wheels on opposite ends of the first spacer arm;
a second spacer arm comprising a plurality of bores on a first side of the second spacer arm and at least one bore on a second side of the second spacer arm, the second spacer arm further comprising a second set of two transversely-mounted wheels on opposite ends of the second spacer arm;
a third spacer arm comprising a plurality of bores on a first side of the third spacer arm and at least one bore on a second side of the third spacer arm, the third spacer arm further comprising a third set of two transversely-mounted wheels on opposite ends of the third spacer arm; and
a fourth spacer arm comprising a plurality of bores on a first side of the fourth spacer arm and at least one bore on a second side of the fourth spacer arm, the fourth spacer arm further comprising a fourth set of two transversely-mounted wheels on opposite ends of the fourth spacer arm,
the first and the second spacer arms assembled together with a plurality of fasteners to form a first half of the spacer and the third and fourth spacer arms assembled together with a plurality of spacer fasteners to form a second half of the spacer.

9. The spacer of claim 8, wherein the first and third spacer arms are identical and wherein the second and fourth spacer arms are identical.

10. The spacer of claim 8, further comprising an additional second spacer for the first half and further comprising an additional fourth spacer for the second half, the additional second spacer assembled into the first half and the additional fourth spacer assembled into the second half.

11. The spacer of claim 8, wherein the at least one bore on the second side of the first spacer arm and the second side of the second spacer arm comprises a plurality of bores.

12. The spacer of claim 8, wherein the second spacer arm and the fourth spacer arm each comprise two laminae.

13. The spacer of claim 8, wherein the first, second, third and fourth spacer arms are machined or fabricated from a thermoplastic material.

14. A spacer, comprising:
a first spacer arm comprising a plurality of bores on a first side of the first spacer arm and at least one bore on a second side of the first spacer arm;
a second spacer arm comprising a plurality of bores on a first side of the second spacer arm and at least one bore on a second side of the second spacer arm;
a third spacer arm comprising a plurality of bores on a first side of the third spacer arm and at least one bore on a second side of the third spacer arm, the third spacer arm further comprising two transversely-mounted wheels on opposite ends of the third spacer arm;
a fourth spacer arm comprising a plurality of bores on a first side of the fourth spacer arm and at least one bore on a second side of the fourth spacer arm;
a fifth spacer arm comprising a plurality of bores on a first side of the fifth spacer arm and at least one bore on a second side of the fifth spacer arm; and
a sixth spacer arm comprising a plurality of bores on a first side of the sixth spacer arm and at least one bore on a second side of the sixth spacer arm, the sixth spacer arm further comprising two transversely-mounted wheels on opposite ends of the sixth spacer arm,
the first, second and third spacer arms assembled together with a plurality of spacer fasteners to form a first half of the spacer and the fourth, fifth and sixth spacer arms assembled together with a plurality of spacer fasteners to form a second half of the spacer.

15. The spacer of claim 14, wherein the first and second halves of the spacer are identical.

16. The spacer of claim 14, wherein the third and sixth spacer arms are not identical to the first, second, fourth and fifth spacer arms, and wherein the third and sixth spacer arms each comprise two substantially similar laminae, and wherein the two transversely mounted wheels are mounted on the two substantially similar laminae.

17. The spacer of claim 14, further comprising an additional first half of the spacer, the first half and the additional first half of the spacer assembled with a plurality of spacer bushings into a double wall spacer first half; and
an additional second half of the spacer, the second half and the additional second half of the spacer assembled with a plurality of spacer bushings into a double wall spacer second half.

18. The spacer of claim 17, wherein in the double wall spacer first half and the double wall spacer second half, the third spacer arms and the sixth spacer arms are assembled on an outer side of the double wall spacer.

19. The spacer of claim 17, wherein the plurality of spacer bushings each comprises five spacer bushings.

20. The spacer of claim 14, wherein the wheels on the opposite ends of the third spacer arm and the wheels on the opposite ends of the sixth spacer arm are oriented at about 90° to each other.

21. A method of loading conduit into multi-part conduit spacers for placement into a casing, a tunnel or a longitudinal arcuate hole, the method comprising:
furnishing a plurality of multi-part conduit spacers, each multi-part conduit spacer comprising:
a first spacer arm comprising a plurality of bores on a first side of the first spacer arm and at least one bore on a second side of the first spacer arm, the first spacer arm further comprising two transversely-mounted wheels on opposite ends of the first spacer arm; and a second spacer arm comprising a plurality of bores on a first side of the second spacer arm and at least one bore on a second side of the second spacer arm, the second spacer arm further comprising two transversely-mounted wheels on opposite ends of the second spacer arm, wherein the first spacer arm and the second spacer arm each comprise a plurality of laminae;

placing a first conduit into an assembly fixture;

placing the first spacer arm atop the first conduit;

assembling a first plurality of conduits atop the first spacer arm;

assembling the second spacer arm to the first plurality of conduits;

assembling a second conduit atop the second spacer arm, thus forming a bundle; and securing the bundle by banding an outside of the bundle.

22. The method of claim 21, wherein the first conduit comprises a second plurality of conduits and the second conduit comprises a third plurality of conduits, and wherein the step of placing the first spacer arm atop the first conduit comprises placing the first spacer arm atop the second plurality of conduits and wherein the step of assembling the second conduit atop the second spacer arm comprises assembling the third plurality of conduits atop the second spacer arm.

23. The method of claim 21, wherein the step of assembling a second conduit atop the second spacer arm comprises side-loading a second plurality of conduits onto the first and second spacer arms and then top loading a third plurality of conduits atop the second spacer arm.

24. The method of claim 21, wherein the first spacer arm and the second spacer arm each comprises a plurality of laminae.

25. The method of claim 21, wherein the first spacer arm and the second spacer arm each comprises a double-wall spacer.

26. The method of claim 21, wherein the first spacer arm and the second spacer arm comprise HDPE.

27. The method of claim 21, wherein the first conduit, the second conduit and two conduits of the first plurality of conduits have a same diameter.

28. The method of claim 21, wherein the first plurality of conduits includes four conduits having a same diameter.

29. The method of claim 22, wherein the second plurality of conduits includes two conduits, one having a first diameter and the other having a second diameter, and the third plurality of conduits also includes two conduits, one having the first diameter and the other having the second diameter.

30. The method of claim 22, wherein the step of assembling the third plurality of conduits atop the second spacer arm comprises assembling first and second conduits atop the second spacer arm; assembling first and second conduits between the first and second spacer arms on a first side of the first and second spacer arms; and assembling first and second conduits between the first and second spacer arms on a second side of the first and second spacer arms.

* * * * *